US012745311B2

(12) United States Patent
Rajendran et al.

(10) Patent No.: US 12,745,311 B2
(45) Date of Patent: Sep. 22, 2026

(54) METHOD AND APPARATUS FOR SUPPORTING ENHANCED NON-PUBLIC NETWORKS OPERATION IN COMMUNICATION SYSTEM

(71) Applicant: Samsung Electronics Co., Ltd., Suwon-si (KR)

(72) Inventors: Sriganesh Rajendran, Bangalore (IN); Vinay Kumar Shrivastava, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 195 days.

(21) Appl. No.: 18/294,043

(22) PCT Filed: Aug. 3, 2022

(86) PCT No.: PCT/KR2022/011505
§ 371 (c)(1),
(2) Date: Jan. 31, 2024

(87) PCT Pub. No.: WO2023/014097
PCT Pub. Date: Feb. 9, 2023

(65) Prior Publication Data

US 2024/0334532 A1 Oct. 3, 2024

(30) Foreign Application Priority Data

Aug. 4, 2021 (IN) ............................. 202141035209
Jul. 7, 2022 (IN) ............................ 2021 41035209

(51) Int. Cl.
*H04W 76/10* (2018.01)
*H04W 4/90* (2018.01)
(Continued)

(52) U.S. Cl.
CPC ........... *H04W 76/27* (2018.02); *H04W 76/10* (2018.02)

(58) Field of Classification Search
CPC ..... H04W 76/10; H04W 76/27; H04W 76/50; H04W 4/90
See application file for complete search history.

(56) References Cited

U.S. PATENT DOCUMENTS 12,309,680 B2 * 5/2025 Tseng ...................... H04W 4/90
2014/0357285 A1 12/2014 Smith et al.
(Continued)

FOREIGN PATENT DOCUMENTS

WO 2020/204501 A1 10/2020
WO 2021/062667 A1 4/2021
WO 2021/066427 A1 4/2021

OTHER PUBLICATIONS

Nokia et al., Draft Stage 2 CR: Non-Public Network enhancements, R2-2105242, 3GPP TSG RAN WG2 Meeting #114e, Online, May 10, 2021.

(Continued)

*Primary Examiner* — Kent Krueger
(74) *Attorney, Agent, or Firm* — Jefferson IP Law, LLP

(57) ABSTRACT

The disclosure relates to a 5G or 6G communication system for supporting a higher data transmission rate. A method performed by a user equipment (UE) in a wireless communication system is provided. The method includes receiving, from a base station, first system information including information on at least one stand-alone non-public network (SNPN), receiving, from the base station, second system information including information on a first list of at least one group identifier for network selection (GIN) to support an access using credentials from a credentials holder or to enable a UE onboarding and information on a second list of associations between the at least one GIN and the at least (Continued)

one SNPN in the first system information, selecting an SNPN based on the first system information and the second system information; and performing, with the base station, a radio resource control (RRC) establishment for the selected SNPN.

16 Claims, 10 Drawing Sheets

(51) Int. Cl.
*H04W 76/27* (2018.01)
*H04W 76/50* (2018.01)

(56) References Cited

U.S. PATENT DOCUMENTS

| | | | | |
|---|---|---|---|---|
| 2021/0058784 | A1* | 2/2021 | Kedalagudde | H04W 76/12 |
| 2021/0099924 | A1 | 4/2021 | Shih et al. | |
| 2021/0105712 | A1 | 4/2021 | Speicher et al. | |
| 2022/0046530 | A1* | 2/2022 | Lai | H04W 48/18 |
| 2022/0312359 | A1* | 9/2022 | Shih | H04W 8/205 |
| 2022/0360962 | A1* | 11/2022 | Tseng | H04W 8/183 |
| 2022/0361098 | A1* | 11/2022 | Shih | H04W 4/90 |
| 2023/0136425 | A1* | 5/2023 | Kim | H04W 8/186 370/331 |
| 2024/0172093 | A1* | 5/2024 | Kim | H04W 76/10 |
| 2024/0306083 | A1* | 9/2024 | Vangala | H04W 60/04 |

OTHER PUBLICATIONS

Samsung, On Supporting Visited SNPN with Credentials, R2-2104041, 3GPP TSG-RAN WG2 Meeting #113bis-e, Online, Sep. 28, 2023.
Samsung, On Supporting Onboarding SNPN, R2-2104043, 3GPP TSG-RAN WG2 Meeting #113bis-e, Online, Apr. 2, 2021.
Samsung, On Supporting Visited SNPN with Credentials, R2-2106199, 3GPP TSG-RAN WG2 Meeting #114-e, Online, May 11, 2021.
Samsung, On Supporting Onboarding SNPN, R2-2106200, 3GPP TSG-RAN WG2 Meeting #114-e, Online, May 11, 2021.
3rd Generation Partnership Project; Technical Specification Group Radio Access Network; NR; Radio Resource Control (RRC) protocol specification (Release 17), 3GPP TS 38.331 V17.6.0, Sep. 28, 2023.
3rd Generation Partnership Project; Technical Specification Group Radio Access Network; NR; NR and NG-RAN Overall Description; Stage 2 (Release 17), 3GPP TS 38.300 V17.6.0, Apr. 13, 2022.
3rd Generation Partnership Project; Technical Specification Group Core Network and Terminals; Non-Access-Stratum (NAS) functions related to Mobile Station (MS) in idle mode (Release 17), 3GPP TS 23.122 V17.6.0, Mar. 22, 2022.
3rd Generation Partnership Project; Technical Specification Group Radio Access Network; NR; Radio Resource Control (RRC) protocol specification (Release 17), 3GPP TS 38.331 V17.0.0, Apr. 19, 2022.
Indian Office Action dated Mar. 6, 2023, issued in Indian Application No. 202141035209.
International Search Report dated Nov. 7, 2022, issued in International Application No. PCT/KR2022/011505.
Korean Office Action with English translation dated Apr. 21, 2026; Korean Appln. No. 10-2024-7004088.

* cited by examiner

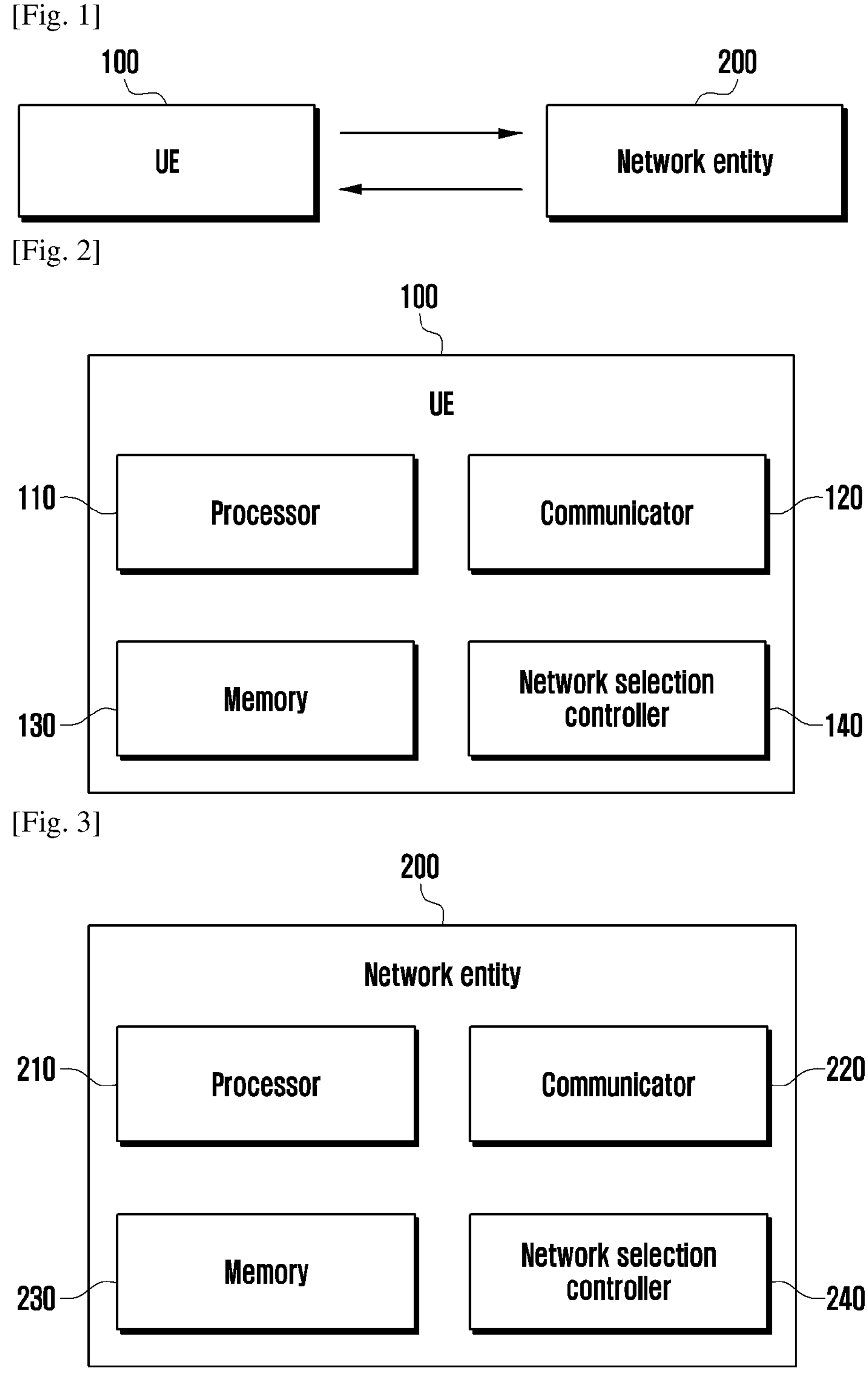
[Fig. 1]
100
200
UE
Network entity
[Fig. 2]
100
UE
110
Processor
Communicator
120
130
Memory
Network selection controller
140
[Fig. 3]
200
Network entity
210
Processor
Communicator
220
230
Memory
Network selection controller
240

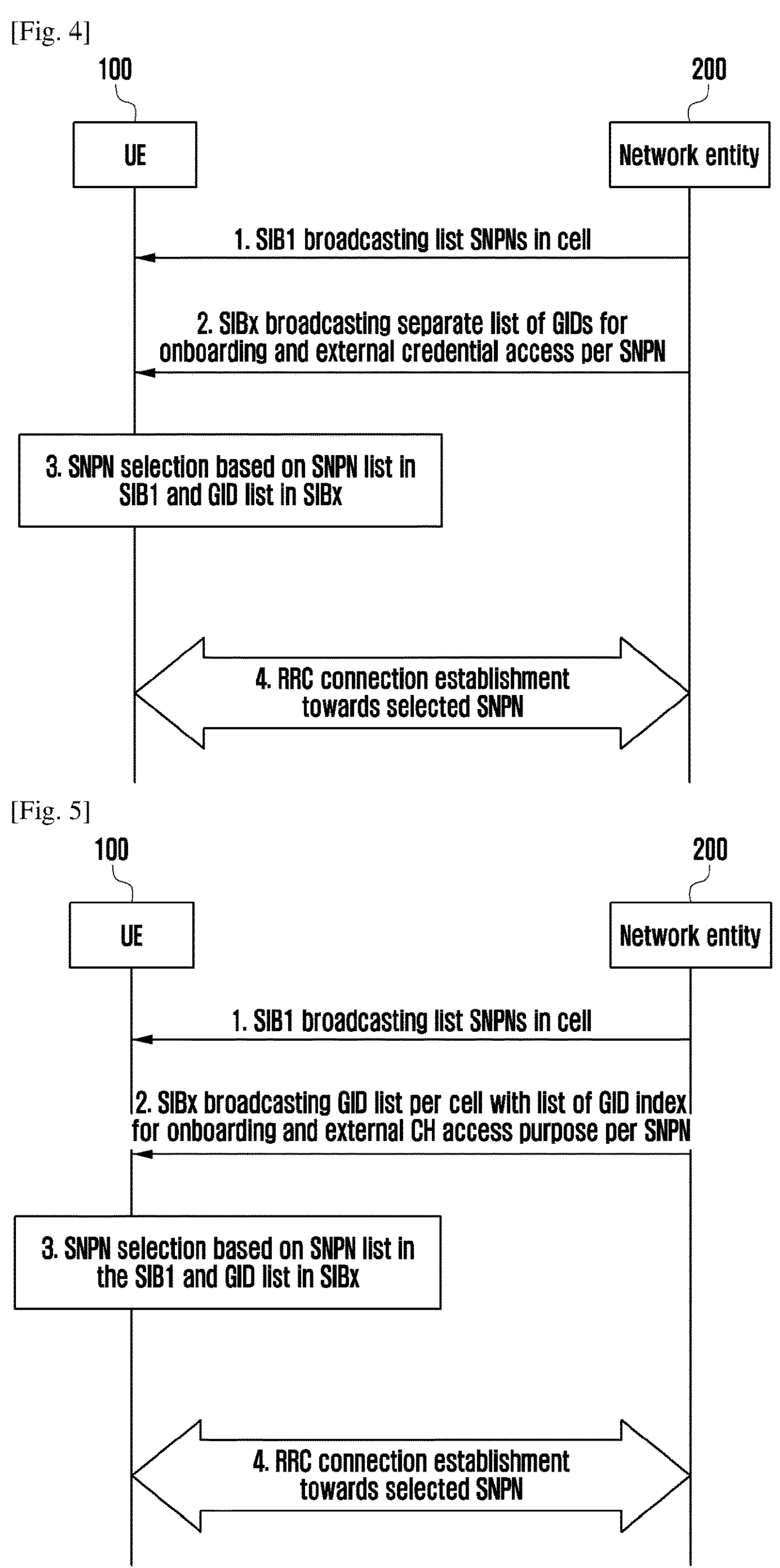
[Fig. 4]
100
200
UE
Network entity
1. SIB1 broadcasting list SNPNs in cell
2. SIBx broadcasting separate list of GIDs for onboarding and external credential access per SNPN
3. SNPN selection based on SNPN list in SIB1 and GID list in SIBx
4. RRC connection establishment towards selected SNPN
[Fig. 5]
100
200
UE
Network entity
1. SIB1 broadcasting list SNPNs in cell
2. SIBx broadcasting GID list per cell with list of GID index for onboarding and external CH access purpose per SNPN
3. SNPN selection based on SNPN list in the SIB1 and GID list in SIBx
4. RRC connection establishment towards selected SNPN

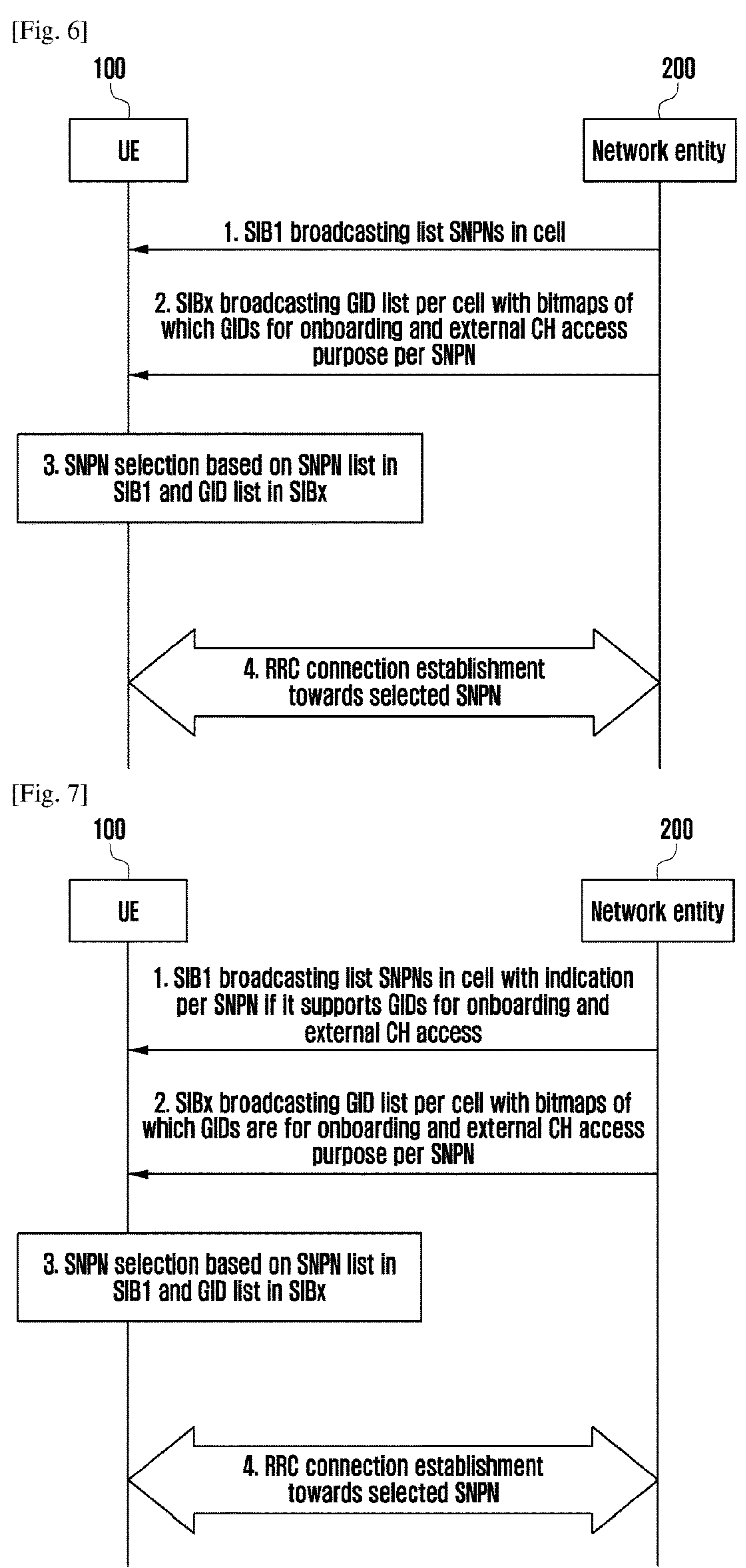
[Fig. 6]
100
200
UE
Network entity
1. SIB1 broadcasting list SNPNs in cell
2. SIBx broadcasting GID list per cell with bitmaps of which GIDs for onboarding and external CH access purpose per SNPN
3. SNPN selection based on SNPN list in SIB1 and GID list in SIBx
4. RRC connection establishment towards selected SNPN
[Fig. 7]
100
200
UE
Network entity
1. SIB1 broadcasting list SNPNs in cell with indication per SNPN if it supports GIDs for onboarding and external CH access
2. SIBx broadcasting GID list per cell with bitmaps of which GIDs are for onboarding and external CH access purpose per SNPN
3. SNPN selection based on SNPN list in SIB1 and GID list in SIBx
4. RRC connection establishment towards selected SNPN

[Fig. 8]
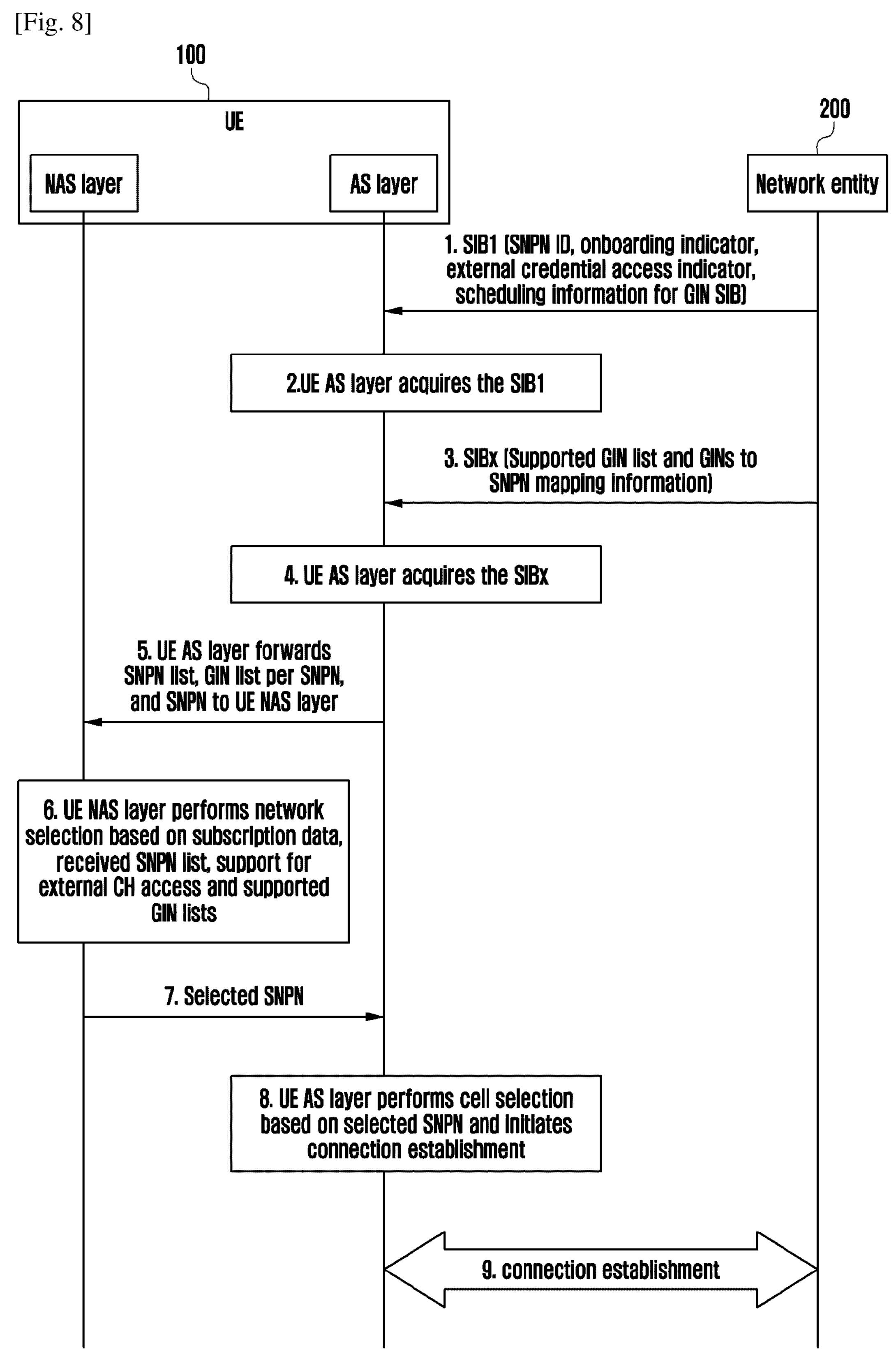

[Fig. 9]
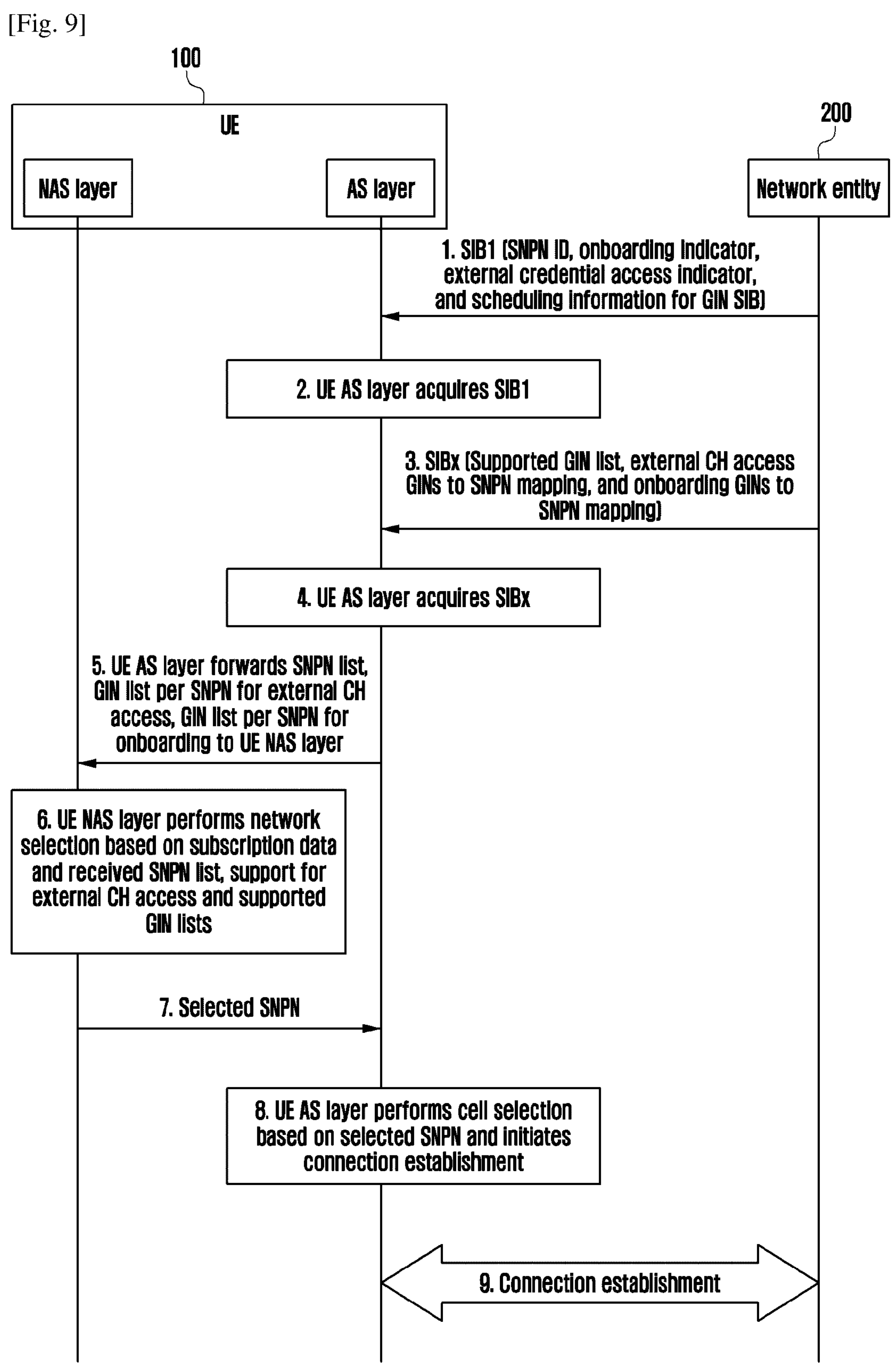

[Fig. 10]
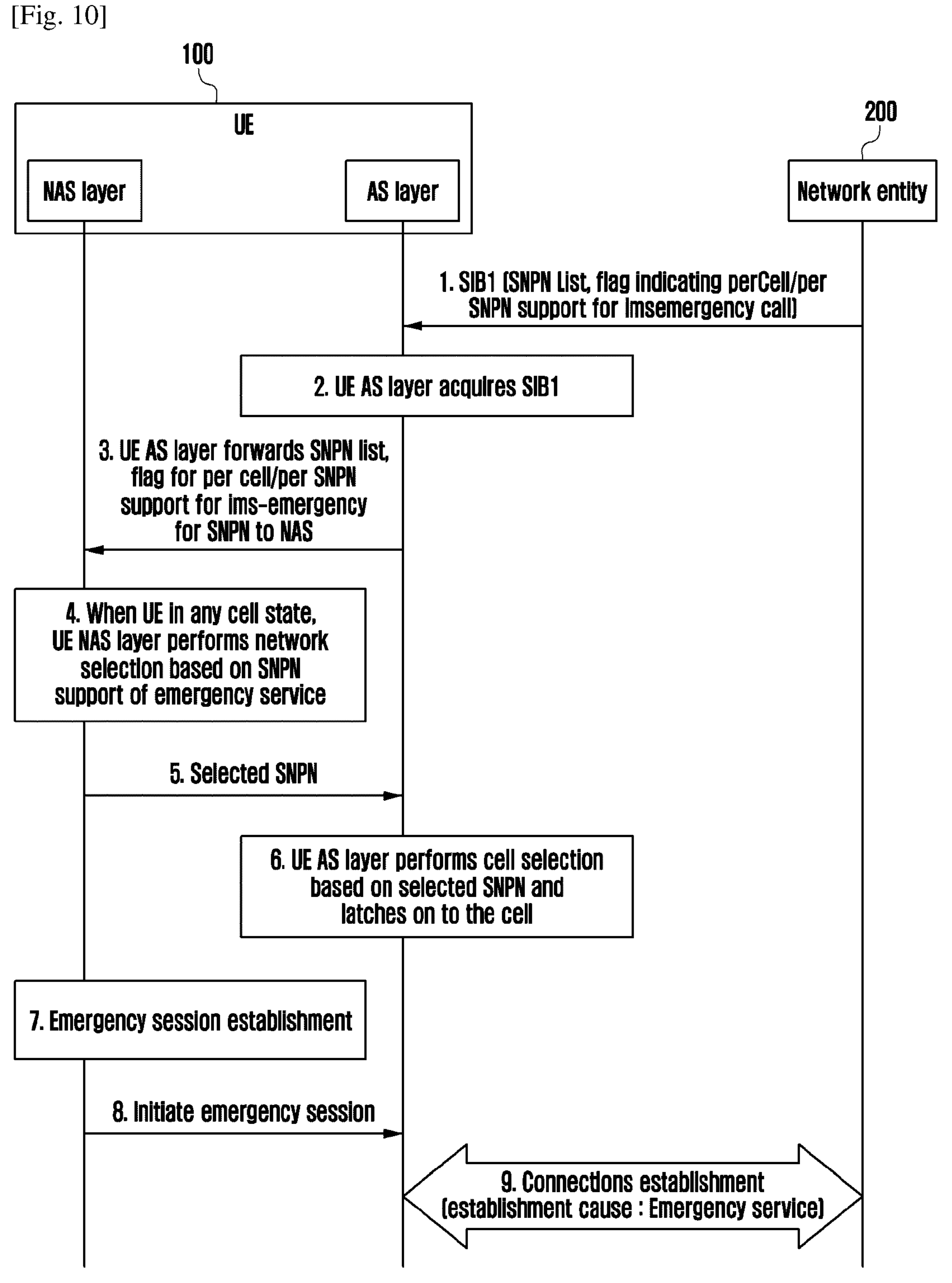

[Fig. 11]
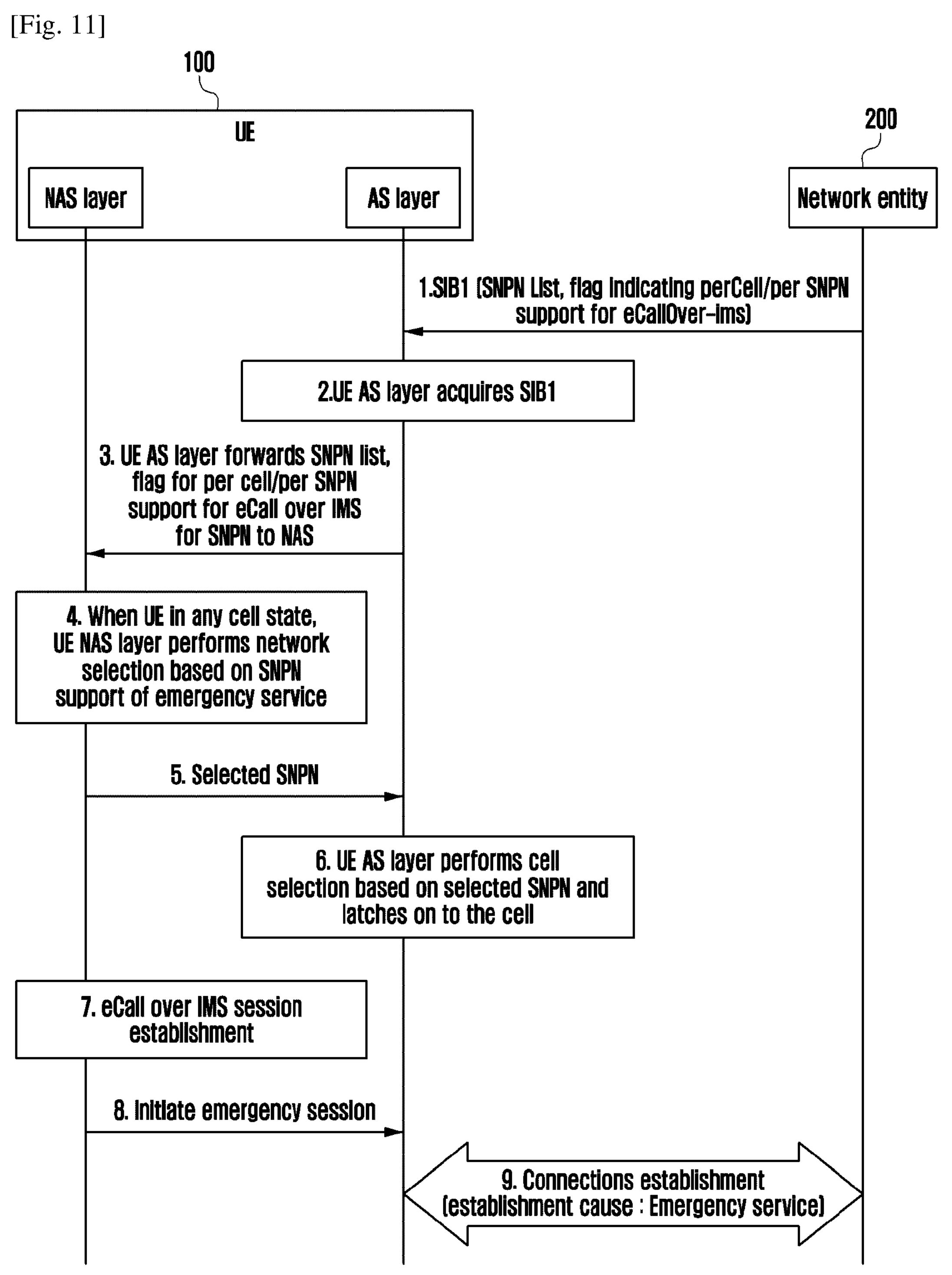

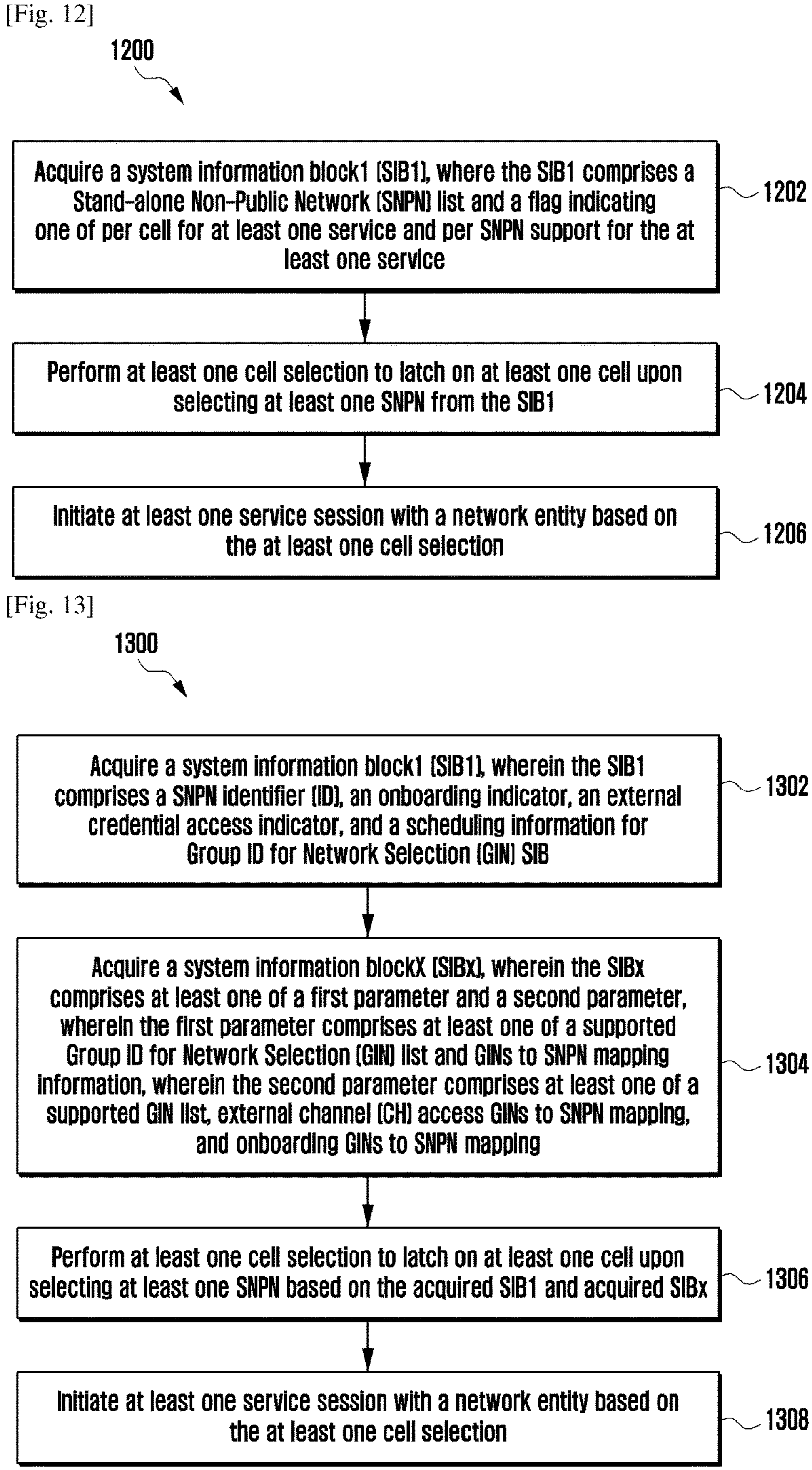
[Fig. 12]
1200
Acquire a system information block1 (SIB1), where the SIB1 comprises a Stand-alone Non-Public Network (SNPN) list and a flag indicating one of per cell for at least one service and per SNPN support for the at least one service
1202
Perform at least one cell selection to latch on at least one cell upon selecting at least one SNPN from the SIB1
1204
Initiate at least one service session with a network entity based on the at least one cell selection
1206
[Fig. 13]
1300
Acquire a system information block1 (SIB1), wherein the SIB1 comprises a SNPN identifier (ID), an onboarding indicator, an external credential access indicator, and a scheduling information for Group ID for Network Selection (GIN) SIB
1302
Acquire a system information blockX (SIBx), wherein the SIBx comprises at least one of a first parameter and a second parameter, wherein the first parameter comprises at least one of a supported Group ID for Network Selection (GIN) list and GINs to SNPN mapping information, wherein the second parameter comprises at least one of a supported GIN list, external channel (CH) access GINs to SNPN mapping, and onboarding GINs to SNPN mapping
1304
Perform at least one cell selection to latch on at least one cell upon selecting at least one SNPN based on the acquired SIB1 and acquired SIBx
1306
Initiate at least one service session with a network entity based on the at least one cell selection
1308

[Fig. 14]
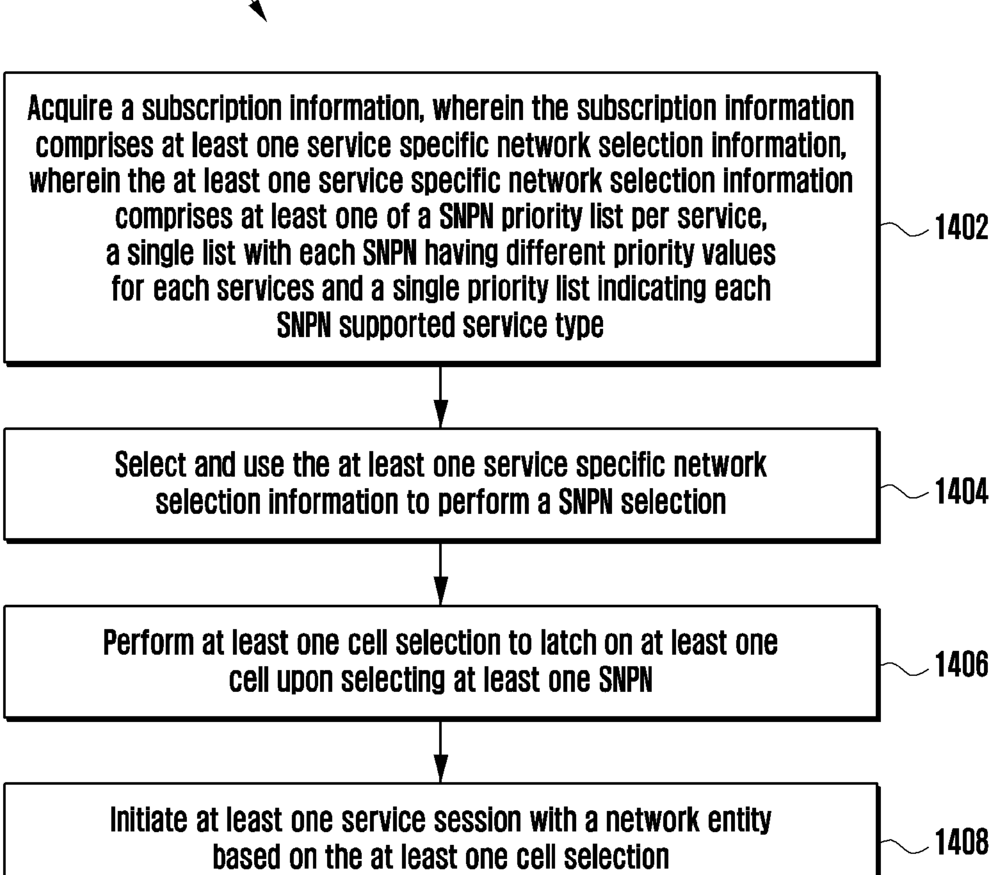

[Fig. 15]

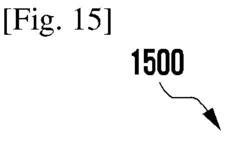

Transmit a system information block1 (SIB1) to a UE, wherein the SIB1 comprises a SNPN identifier (ID), an onboarding indicator, an external credential access indicator, and a scheduling information for Group ID for Network Selection (GIN) SIB — 1502

Transmit a system information blockX (SIBx), wherein the SIBx comprises at least one of a first parameter and a second parameter, wherein the first parameter comprises at least one of a supported Group ID for Network Selection (GIN) list and GINs to SNPN mapping information, wherein the second parameter comprises at least one of a supported GIN list, external channel (CH) access GINs to SNPN mapping, and onboarding GINs to SNPN mapping — 1504

Perform an admission of connection request from the UE to obtain access to at least one of service supported by the network — 1506

Establish the at least one service session with the UE — 1508

METHOD AND APPARATUS FOR SUPPORTING ENHANCED NON-PUBLIC NETWORKS OPERATION IN COMMUNICATION SYSTEM

TECHNICAL FIELD

Embodiments disclosed herein relate to Fifth Generation (5G) communication networks, and more particularly to non-public network operations for the UE and the Network entity in the 5G communication networks.

BACKGROUND ART 5G mobile communication technologies define broad frequency bands such that high transmission rates and new services are possible, and can be implemented not only in "Sub 6 GHz" bands such as 3.5 GHZ, but also in "Above 6 GHZ" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

Release 16 of 3$^{rd}$ Generation Partnership Project (3GPP) specification introduced Non-public networks or private networks as a way of providing services to a user defined organization or a group of organizations. The 5G non-public network can be deployed on the organizations' defined premises such as a campus or a factory or be provisioned to cater to specific use cases like delivering media content in a stadium or a concert.

DISCLOSURE OF INVENTION

Technical Problem

The 3GPP has started studying on Rel-17 enhanced Non-Public Networks (eNPN) work item and there are many significant issues which need to be addressed. As part of 3GPP's Release 17 work item, enhancements for Non-public networks are being studied and the key features being looked into are providing support for:

1) Stand-alone Non-Public Network (SNPN) along with subscription/credentials owned by an entity separate from the SNPN, 2) UE onboarding and provisioning for NPN, and
3) Internet Protocol (IP) Multimedia Subsystem (IMS) voice and emergency services for the SNPN.

In a legacy system, a User Equipment (UE) in a SNPN access mode can select a network broadcasting a network ID (e.g., SNPN ID as part of SIB1) which is configured in the UE as part of subscription data. In order for the SNPN to provide roaming like support, the support for SNPNs to allow external credential entities and access of UEs owning subscription from these external credential providers was introduced. The SNPN can have service level agreements (SLAs) with multiple external credential holders to provide services to their UEs roaming into the coverage of the said SNPNs. In order for the UEs to know which SNPNs support Service Providers (SPs) for which it holds subscription to, the SP can configure the UE with a list of preferred SNPNs which the UEs can access to gain services. Alternatively, the network can broadcast the list of service provider IDs it has SLAs with and UEs owning subscription to one of the broadcasted SP IDs can access the network. This poses an issue when the number of SPs partnering with SNPN are large causing the huge signalling overhead in broadcasting all the SP IDs. In order to counter this issue of signalling overhead, the concept of home SP groups was introduced. Group ID denotes an identity of a group of SPs with which the SNPN has agreement with and UE owning subscription to any of the SPs in the group can access the SNPN. The signalling overhead is significantly reduced by broadcasting the Group ID instead of individual SP IDs. In order to support onboarding feature in the SNPN, it was proposed that the network reuse the concept of Group IDs to indicate the UEs the SPs for which the onboarding is allowed. However, it is unclear as to how this Group IDs are signalled especially in a shared network deployment and/or with SNPN acting as onboarding network and/or allowing external credential access.

The SNPN was introduced in Release 16 of 3GPP specification and it was explicitly noted as part of the specification that SNPNs don't support emergency services. One of key issues in Release 17 related to SNPNs is to enable emergency services. However, it is not clear as to what are the signalling changes required to support emergency feature in SNPNs.

With Release 17, the roaming like solution for SNPN is being studied, and access to SNPNs other than the Service Providers' SNPNs needs to be enabled. The SNPNs can be deployed to provide different kinds of services and to cater for different requirements like mission critical communication or multimedia services. The UE can be subscribed to more than one type of services offered by the SP. It is possible for the SP to meet the requirements of the subscribed UEs if UE accesses the services through SP owned SNPNs as it controls the network. This might not be the situation in case of roaming, and UE tries to access Visited-SNPN (VSNPN) since not all VSNPNs are deployed to offer same set of services as SP of the accessing UE. Thus, there is a need to address the issue of selecting a VSNPN based on type of service being requested by UE.

Solution to Problem

In accordance with an aspect of the disclosure, a method performed by a user equipment (UE) in a wireless communication system is provided. The method includes receiving, from a base station, first system information including information on at least one stand-alone non-public network (SNPN), receiving, from the base station, second system information including information on a first list of at least one group identifier for network selection (GIN) to support an access using credentials from a credentials holder or to enable a UE onboarding and information on a second list of associations between the at least one GIN and the at least one SNPN in the first system information, selecting an SNPN based on the first system information and the second system information; and performing, with the base station, a radio resource control (RRC) establishment for the selected SNPN.

In accordance with another aspect of the disclosure, a method performed by a base station in a wireless communication system is provided. The method includes transmitting first system information including information on at least one SNPN, transmitting second system information including information on a first list of at least one GIN to support an access using credentials from a credentials holder or to enable a UE onboarding and information on a second list of associations between the at least one GIN and the at least one SNPN in the first system information; and performing, with a UE, an RRC establishment for an SNPN selected by the UE according to the first system information and the second system information.

In accordance with another aspect of the disclosure, A UE in a wireless communication system is provided. The UE includes a transceiver and a controller. The controller is configured to receive, from a base station via the transceiver, first system information including information on at least one SNPN, receive, from the base station via the transceiver, second system information including information on a first list of at least one GIN to support an access using credentials from a credentials holder or to enable a UE onboarding and information on a second list of associations between the at least one GIN and the at least one SNPN in the first system information, select an SNPN based on the first system information and the second system information, and perform, with the base station, an RRC establishment for the selected SNPN.

In accordance with another aspect of the disclosure, a base station in a wireless communication system is provided. The base station includes a transceiver and a controller. The controller is configured to transmit, via the transceiver, first system information including information on at least one SNPN, transmit, via the transceiver, second system information including information on a first list of at least one GIN to support an access using credentials from a credentials holder or to enable a UE onboarding and information on a second list of associations between the at least one GIN and the at least one SNPN in the first system information, and perform, with a UE, an RRC establishment for an SNPN selected by the UE according to the first system information and the second system information.

In an example, the embodiments herein provide a method for handling a network selection information in a non-public network. The method includes acquiring, by a UE, a system information block1 (SIB1). The SIB1 comprises a Stand-alone Non-Public Network (SNPN) list and a flag indicating one of per cell support for at least one service and per SNPN support for the at least one service. Further, the method includes performing, by the UE, at least one cell selection to latch on at least one cell upon selecting at least one SNPN from the SIB1. Further, the method includes initiating, by the UE, at least one service session with a network entity based on the at least one cell selection.

In an example, the embodiments herein provide a method for handling network selection information in a non-public network. The method includes acquiring, by a UE, a system information block1 (SIB1). The SIB1 comprises a SNPN ID, an onboarding indicator, an external credential access indicator, and a scheduling information for a system information blockX (SIBx) for Group ID for Network Selection (GIN). Further, the method includes acquiring, by the UE, the SIBx, wherein the SIBx comprises at least one of a first parameter and a second parameter, wherein the first parameter comprises at least one of a supported Group ID for Network Selection (GIN) list and GINs to SNPN mapping information, wherein the second parameter comprises at least one of a supported GIN list, external Credential Holders (CH) access GINs to SNPN mapping, and onboarding GINs to SNPN mapping. Further, the method includes performing, by the UE, at least one cell selection to latch on at least one cell upon selecting at least one SNPN based on the acquired SIB1 and the acquired SIBx. Further, the method includes initiating, by the UE, at least one service session with a network entity based on the at least one cell selection.

In an example, the embodiments herein provide a method for handling network selection information in a non-public network. The method includes acquiring, by a UE, a subscription information. The subscription information comprises at least one service specific network selection information, wherein the at least one service specific network selection information comprises at least one of a SNPN priority list per service, a single list with each SNPN having different priority values for each services and a single priority list indicating each SNPN supported service type. Further, the method includes selecting and using, by the UE, the at least one service specific network selection information to perform a SNPN selection. Further, the method includes performing, by the UE, at least one cell selection to latch on at least one cell upon selecting at least one SNPN. Further, the method includes initiating, by the UE, at least one service session with the network entity based on the at least one cell selection.

In an example, the embodiments herein provide a method for handling network selection information in a non-public network. The method includes transmitting, by a network entity, a system information block1 (SIB1) to a User Equipment. The SIB1 comprises a SNPN identifier (ID), an onboarding indicator, an external credential access indicator, and a scheduling information for a system information blockX (SIBx) for Group ID for Network Selection (GIN). Further, the method includes transmitting, by the network entity, the SIBx, wherein the SIBx comprises at least one of a first parameter and a second parameter, wherein the first parameter comprises at least one of a supported Group ID for Network Selection (GIN) list and GINs to SNPN mapping information, wherein the second parameter comprises at least one of a supported GIN list, external Credential Holders (CH) access GINs to SNPN mapping, and onboarding GINs to SNPN mapping. Further, the method includes performing, by the network entity, an admission of connection request from UE for obtaining access to at least one of service supported by the network entity. Further, the method includes establishing, by the network entity, the at least one service session with a UE.

In an example, the embodiments herein provide a UE for handling a network selection information in a non-public network. The UE includes a network selection controller coupled with the processor and the memory. The network selection controller is configured to acquire a system information block1 (SIB1), wherein the SIB1 comprises a Standalone Non-Public Network (SNPN) list and a flag indicating one of per cell support for at least one service and per SNPN support for the at least one service. Further, the network selection controller is configured to perform at least one cell selection to latch on at least one cell upon selecting at least one SNPN from the SIB1. Further, the network selection controller is configured to initiate at least one service session with a network entity based on the at least one cell selection.

In an example, the embodiments herein provide a UE for handling a network selection information in a non-public network. The UE includes a network selection controller coupled with the processor and the memory. The network selection controller is configured to acquire a system information block1 (SIB1), wherein the SIB1 comprises a SNPN identifier (ID), an onboarding indicator, an external credential access indicator, and a scheduling information for a system information blockX (SIBx) for Group ID for Network Selection (GIN). The network selection controller is configured to acquire the SIBx, wherein the SIBx comprises at least one of a first parameter and a second parameter, wherein the first parameter comprises at least one of a supported Group ID for Network Selection (GIN) list and GINs to SNPN mapping information, wherein the second parameter comprises at least one of a supported GIN list, external Credential Holders (CH) access GINs to SNPN mapping, and onboarding GINs to SNPN mapping. Further, the network selection controller is configured to perform at least one cell selection to latch on at least one cell upon selecting at least one SNPN based on the acquired SIB1 and acquired SIBx. Further, the network selection controller is configured to initiate at least one service session with a network entity based on the at least one cell selection.

In an example, the embodiments herein provide a UE for handling a network selection information in a non-public network. The UE includes a network selection controller coupled with the processor and the memory. The network selection controller is configured to acquire a subscription information, wherein the subscription information comprises at least one service specific network selection information, wherein the at least one service specific network selection information comprises at least one of a SNPN priority list per service, a single list with each SNPN having different priority values for each services and a single priority list indicating each SNPN supported service type. Further, the network selection controller is configured to select and use the at least one service specific network selection information to perform a SNPN selection. Further, the network selection controller is configured to perform at least one cell selection to latch on at least one cell upon selecting at least one SNPN. Further, the network selection controller is configured to initiate at least one service session with a network entity based on the at least one cell selection.

In an example, the embodiments herein provide a network entity for handling a network selection information in a non-public network. The network entity includes a network selection controller coupled with a processor and a memory. The network selection controller is configured to transmit a system information block1 (SIB1) to a UE. The SIB1 comprises a SNPN identifier (ID), an onboarding indicator, an external credential access indicator, and a scheduling information for a system information blockX (SIBx) for Group ID for Network Selection (GIN). Further, the network selection controller is configured to transmit the SIBx, wherein the SIBx comprises at least one of a first parameter and a second parameter, wherein the first parameter comprises at least one of a supported Group ID for Network Selection (GIN) list and GINs to SNPN mapping information, wherein the second parameter comprises at least one of a supported GIN list, external Credential Holders (CH) access GINs to SNPN mapping, and onboarding GINs to SNPN mapping. Further, the network selection controller is configured to perform an admission of connection request from the UE to obtain access to at least one of service supported by the network entity. Further, the network selection controller is configured to establish at least one service session with a UE.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the scope thereof, and the embodiments herein include all such modifications.

Advantageous Effects of Invention

According to embodiments of the present disclosure, non-public network (NPN) operations in 5G networks can be enhanced, wherein support is provided for SNPN along with subscription/credentials owned by an entity separate from the SNPN. Further, based on a proposed method, a flag indicates a network support of emergency call over IMS for SNPNs that allows a UE to access SNPNs for emergency services. Further, a SIB for broadcasting GIN lists supported by the network that enable the network and the UE to select and access SNPNs using credential from external credential holders and access SNPN for onboarding and provisioning. The proposed method can be used for enhancing the network selection related configurations provisioned to the UE by service providers to address cases where network selection can be dependent on type of service the UE is trying to access.

According to embodiments of the present disclosure NPN operations in 5G networks can be enhanced, wherein support is provided for IMS voice and emergency service for the SNPN, wherein support is provided for broadcasting of Group IDs for Network Selection (GINs), and wherein network selection is enhanced during roaming in SNPN access mode.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 1 is an example block diagram illustrating a non-public network for handling a network selection information, according to embodiments as disclosed herein;

FIG. 2 shows various hardware components of a UE, according to embodiments as disclosed herein;

FIG. 3 shows various hardware components of a network entity, according to embodiments as disclosed herein;

FIG. 4 illustrates signaling solutions related to broadcasting of GIN parameter, according to embodiments as disclosed herein;

FIG. 5 illustrates signaling solutions related to broadcasting of GIN parameter, according to embodiments as disclosed herein FIG. 6 illustrates signaling solutions related to broadcasting of GIN parameter, according to embodiments as disclosed herein FIG. 7 illustrates signaling solutions related to broadcasting of GIN parameter, according to embodiments as disclosed herein FIG. 8 illustrates a sequential diagram of GIN broadcasting in SIB x indicating a common mapping between GIN list and SNPN for both onboarding and external Credential Holders (CH) access use, according to embodiments as disclosed herein;

FIG. 9 illustrates a sequential diagram of GIN broadcasting in SIB x indicating a separate list for mapping between GIN list and SNPN for onboarding and external CH access use, according to embodiments as disclosed herein;

FIG. 10 illustrates a sequential diagram of broadcasting in SIB1 SNPN support of emergency call over IMS, according to embodiments as disclosed herein;

FIG. 11 illustrates a sequential diagram of broadcasting in SIB1 SNPN support of eCall over IMS, according to embodiments as disclosed herein;

FIG. 12 is a flow chart illustrating methods, implemented by the UE, for handling the network selection information in the non-public network, according to embodiments as disclosed herein;

FIG. 13 is a flow chart illustrating methods, implemented by the UE, for handling the network selection information in the non-public network, according to embodiments as disclosed herein FIG. 14 is a flow chart illustrating methods, implemented by the UE, for handling the network selection information in the non-public network, according to embodiments as disclosed herein and FIG. 15 is a flow chart illustrating methods, implemented by the network entity, for handling the network selection information in the non-public network, according to embodiments as disclosed herein.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (cNB), access point (AP), 5G NB (5GNB), or gNB.

The "UE" is an entity communicating with a BS and may be referred to as UE, device, mobile station (MS), mobile equipment (ME), or terminal.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods for handling a network selection information in a non-public network. The method includes acquiring, by a UE, a system information block1 (SIB1). The SIB1 comprises a Stand-alone Non-Public Network (SNPN) list and a flag indicating one of a per cell support for at least one service and a per SNPN support for the at least one service. Further, the method includes performing, by the UE, at least one cell selection to latch on at least one cell upon selecting at least one SNPN from the SIB1. Further, the method includes initiating, by the UE, at least one service session with a network entity based on the at least one cell selection.

In the proposed method, the flag indicates a network support of emergency call over IMS for SNPNs that allows UE to access SNPNs for emergency services. Further, the SIB for broadcasting GIN lists supported by the network that enable the network and UE to select and access SNPNs using credential from external credential holders (CH) and access SNPN for onboarding and provisioning. The proposed method can be used for enhancing the network selection related configurations provisioned to the UE by the service providers to address cases where network selection can be dependent on type of service the UE is trying to access.

Referring now to the drawings, and more particularly to FIGS. 1 through 15, where similar reference characters denote corresponding features consistently throughout the figures, there are shown example embodiments.

FIG. 1 is an example illustration in which a non-public network (1000) for handling a network selection information, according to embodiments as disclosed herein. In an embodiment, the non-public network (1000) includes a UE (100) and a network entity (200). The UE (100) can be, for example, but not limited to a laptop, a desktop computer, a notebook, a vehicle to everything (V2X) device, a smartphone, a tablet, an internet of things (IoT) device, an immersive device, a virtual reality device, a television, a dongle device, a foldable device or the like. The network entity (200) can be, for example, but not limited to a gNB, nodeB, or the like.

Broadcasting of Group IDs: In an embodiment, a SNPN can act both as an onboarding network as well as provide service to a UE (100) with subscription from external credential entities. The network entity (200) can broadcast GINs as a way to indicate to the UEs (100), the list of supported service providers which are currently accepting onboarding requests and/or allowing access to UEs (100) which own their subscriptions through this SNPN.

In another embodiment, the network entity (200) may broadcast the GINs for onboarding and external credential access separately. The reason for broadcasting them separately is that a SNPN support of certain GIN for onboarding purpose does not guarantee that the same GIN is supported for external credential access or vice versa.

In the embodiments, SIBx can be an existing SIB (e.g., SIB-10, SIB18) or a new SIB introduced for eNPN.

In an embodiment, the network entity (200) may use at least one of the following approaches to broadcast the GINs related to onboarding and external credential access.

Option 1: (as shown in FIG. 4 illustrates the signaling flow for broadcasting GINs using this solution and UE (100) utilizing it to perform network selection):

a. Broadcast a separate list of GINs relating to onboarding and external credential access per SNPN.

b. The total GINs supported by all SNPNs for both onboarding and external credential access not to exceed maxGIN-r17.

The following Table 1 illustrates the ASN message structure used for signalling GINs based on the option 1.

TABLE 1

```
SIBx
SIBx contains the supported GINs of the NPNs listed in SIB1.
-- ASN1START
-- TAG-SIB10-START
SIBx-r17 ::= SEQUENCE {
snpnGinMappingInfoList-r17 SEQUENCE (SIZE(1...maxNPN-r16)) of
snpnGinMap- pingInfo-r17 OPTIONAL,
nonCriticalExtension SEQUENCE { } OPTIONAL
}
snpnGinMappingInfo-r17 ::= SEQUENCE {
snpnIdx INTEGER(0...maxNPN-r16),
onBoardingGinList-r17 SEQUENCE (SIZE (1..maxGIN-r17)) OF
snpn-r16 OPTIONAL,
extCredAccessGinList-r17 SEQUENCE (SIZE (1..maxGIN-r17)) OF
snpn-r16 OPTIONAL,
...
}
-- TAG-SIB10-STOP
-- ASN1STOP
```

| SIBx Field descriptions |
|---|
| snpnGinMappingInfoList-r17<br>The snpnGinMappingInfoList-r17 is used to configure a set of snpnGinMappingInfo-r17 elements. Each of those elements contains separate lists of GINs for onboarding and external credential access and its associated SNPN Index as derived from SIB1. |

| snpnGinMappingInfo-r17 Field descriptions |
|---|
| snpnIdx<br>Index of SNPN as derived from SIB1<br>onboardingGinList-r17<br>Provides a list of GINs which are supported by the SNPN for onboarding purpose<br>extCredAccessGinList-r17<br>Provides a list of GINs which are supported by the SNPN for external credential access purpose |
| maxGIN-r17: Maximum number of GINs supported in a cell. |

As shown in the FIG. 4, at 1, the network entity (200) sends the SIB1 broadcasting list SNPNs in the cell to the UE (100). At 2, the network entity (200) sends the SIBx broadcasting separate list of GINs for onboarding and external credential access per SNPN to the UE (100). At 3, the UE (100) selects the SNPN based on the SNPN list in the SIB1 and the GIN list in SIBx. At 4, the UE (100) performs the RRC connection establishment towards the selected SNPN with the network entity (200).

In an example scenario depicting the above signaling case, a network deployment consisting of the shared network with SNPN A and SNPN B sharing the gNB where the SNPN A and the SNPN B allow UE access using external credentials. The SNPN A has Service Level Agreement (SLA) with Service Provider (SP) SP1 and SP2, identified through GINs GIN1 and GIN2 respectively. SNPN B has SLAs with SP2 identified by GIN2 for external credential access and GIN3 for onboarding access. The network broadcasts in SIB1 the list of SNPN as {SNPN A, SNPN B} and flag indicating support of SNPN A and SNPN B to allow access to UEs with external credentials and flag indicating SNPN B's support of access for onboarding purpose.

The SIBx broadcasting GINs consists of snpnGinMappingInfoList containing 2 snpnGinMappingInfo elements, one for each supported SNPN of the network.

The sample snpnGinMappingInfo element for SNPN A is filled as shown:

```
snpnGinMappingInfo{
snpnIdx 0,
extCredAccessGinList-r17 {GIN1, GIN2}
}
```

The sample snpnGinMappingInfo element for SNPN B is shown below:

```
snpnGinMappingInfo{
snpnIdx 1,
onBoardingGinList-r17 {GIN3},
extCredAccessGinList-r17 {GIN2}
}
```

The UE holding subscription to SP1 is configured with network selection information, containing list of preferred GIN list as {GIN1}. Upon receiving SIB1 and SIBx, the UE forwards the SNPN and GIN mapping to NAS layer where the SNPN and GINs are compared with the stored subscription data. In this example scenario, the received SNPN and GINs are forwarded to NAS from AS in a sample format as shown below:

{SNPN ID: SNPN A, external credential access supported, external CH GIN list {GIN1,GIN2}}, {SNPN ID: SNPN B, external credential access supported, external CH GIN list {GIN2}, Onboarding access supported, Onboarding GIN list {GIN3}}

Since the preferred GIN configured in UE is GIN1, the result of network selection is SNPN A which supports GIN1. The NAS indicates to AS the selected SNPN as SNPN A and AS performs cell selection procedure to select a cell which broadcasts support for SNPN A.

As another example, the gNB in case of the shared network deployment would have multiple SNPNs sharing same gNB, so in SIB1, it will broadcast the list of SNPNs deployed in that gNB. Say SNPN1, SNPN2 and SNPN3 share the gNB, then SIB1 of gNB will contain SNPN list as {SNPN 1, SNPN 2, SNPN3}.

There can be multiple service providers/service provider groups to which UEs can subscribe to obtain the service. When the UE (100) is subscribed to a service provider, it is provisioned with the subscription data which provides information needed to obtain the service such as network selection information such as preferred SNPN list, preferred GIN list Say the preferred SNPN list consist of {SNPN4, SNPN5} and preferred GIN list consist of {GIN1}. These service providers make service level agreements with the SNPN networks to provide services to the UEs. The network broadcasts the list of GINs which have made service level agreements with that SNPN so that UEs can know that the SNPN supports the said GIN. Say SNPN1 has SLA with GIN1, GIN2, SNPN2 has SLA with GIN2 and GIN3 and SNPN3 does not have any.

Option 2: (as shown in FIG. 5 illustrates the signaling flow for broadcasting GINs using this solution and UE (100) utilizing it to perform network selection):

a. Broadcast a list of all supported GINs of the cell in GINList-r17.

b. The size of the list is maxGIN-r17 which is the maximum number of GINS supported by the cell.

c. Associate each SNPN index as derived from SIB1 with the index of GIN from the list GINList-r17 for onboarding and external credentials separately.

The following Table 2 illustrates the ASN message structure used for signalling GINs based on option 2.

TABLE 2

```
SIBx
SIBx contains the supported GINs of the NPNs listed in SIB1.
-- ASN1START
-- TAG-SIB10-START
SIBx-r17 ::= SEQUENCE {
GINList-r17 SEQUENCE (SIZE(1... maxGIN-r17)) OF snpn-r16
OPTIONAL,
snpnGinMappingInfoList-r17 SEQUENCE (SIZE(1...maxNPN-r16)) of
snpnGinMap- pingInfo-r17 OPTIONAL,
nonCriticalExtension SEQUENCE { } OPTIONAL
}
snpnGinMappingInfo-r17 ::= SEQUENCE {
snpnIdx INTEGER(0...maxNPN-r16),
onBoardingGinList-r17 SEQUENCE (SIZE (1..maxGIN-r17)) OF
INTEGER (0..maxGIN-r17) OPTIONAL,
extCredAccessGinList-r17 SEQUENCE (SIZE (1..maxGIN-r17)) OF
INTEGER (0..maxGIN-r17) OPTIONAL,
...
}
-- TAG-SIB10-STOP
-- ASN1STOP
```

| SIBx Field descriptions |
|---|
| GINList-r17<br>GINList-r17 is used to configure the list of GINs supported in the cell.<br>snpnGinMappingInfoList-r17<br>The snpnGinMappingInfoList-r17 is used to configure a set of snpnGinMappingInfo-r17 elements. Each of those elements contains separate lists of GINs for onboarding and external credential access and its associated SNPN Index as derived from SIB1. |

| snpnGinMappingInfo-r17 Field descriptions |
|---|
| snpnIdx<br>Index of SNPN as derived from SIB1<br>onboardingGinList-r17<br>Provides a list of GIN index derived from GINList-r17 which are supported by the SNPN for onboarding purpose<br>extCredAccessGinList-r17<br>Provides a list of GIN index derived from GINList-r17 which are supported by the SNPN for external credential access purpose |
| maxGIN-r17: Maximum number of GINs supported in a cell. |

As shown in the FIG. 5, at 1, the network entity (200) sends the SIB1 broadcasting list SNPNs in the cell to the UE (100). At 2, the network entity (200) sends the SIBx broadcasting GIN list per cell with list of GINs index for onboarding and external CH access purpose per SNPN to the UE (100). At 3, UE (100) performs the SNPN selection based on SNPN list in SIB1 and GIN list in SIBx. At 4, the UE (100) performs the RRC connection establishment, towards selected SNPN, with the network entity (200).

In an example scenario depicting the above signaling case for option 2, the network deployment consisting of the shared network with SNPN A and SNPN B sharing the gNB where SNPN A and SNPN B allow the UE access using external credentials. SNPN A has Service Level Agreement (SLA) with Service Provider (SP) SP1 and SP2, identified through GINs GIN1 and GIN2 respectively. SNPN B has SLAs with SP2 identified by GIN2 for external credential access and GIN3 for onboarding access. The network broadcasts in SIB1 the list of SNPN as {SNPN A, SNPN B} and flag indicating support of SNPN A and SNPN B to allow access to UEs with external credentials and flag indicating SNPN B's support of access for onboarding purpose.

The SIBx broadcasting GINs consists of the following sample signaling:

```
SIBx-r17 {
GINList-r17 {GIN1, GIN2, GIN3},
snpnGinMappingInfoList-r17 (SIZE(2)) of snpnGinMappingInfo-r17
}
```

The sample snpnGinMappingInfo element for SNPN A is filled as shown:

```
snpnGinMappingInfoList-r17(1)
{
snpnIdx 1,
extCredAccessGinList-r17 {ginIndex 1, ginIndex 2}
}
```

The sample snpnGinMappingInfo element for SNPN A is filled as shown:

```
snpnGinMappingInfoList-r17(2)
{
snpnIdx 2,
onBoardingGinList-r17 {ginIndex 3},
extCredAccessGinList-r17 {ginIndex 2}
}
```

The UE holding subscription to the SP1 is configured with network selection information, containing list of preferred GIN list as {GIN1}. Upon receiving SIB1 and SIBx, the UE (100) forwards the SNPN and GIN mapping to NAS layer where the SNPN and GINs are compared with the stored subscription data. In this example scenario, the received SNPN and GINs are forwarded to NAS from AS in a sample format as shown below:

{SNPN ID: SNPN A, external credential access supported, external CH GIN list {GIN1,GIN2}}, {SNPN ID: SNPN B, external credential access supported, external CH GIN list {GIN2}, Onboarding access supported, Onboarding GIN list {GIN3}} Since the preferred GIN configured in UE is GIN1, the result of network selection is SNPN A which supports GIN1. The NAS indicates to AS the selected SNON as SNPN A and AS performs cell selection procedure to select a cell which broadcasts support for SNPN A.

Option 3a: (as shown in FIG. 6 illustrates the signaling flow for broadcasting GINs using this solution and UE (100) utilizing it to perform network selection):

1) Broadcast a list of all supported GINs of the cell in GINList-r17

2) Association of SNPNs to GINs can be done by:

a) Introducing separate lists of bitmaps for onboarding and external credential access and each element in the list of bitmaps represent SNPN and its supported GINs.

b) The size of the list of bitmaps is equal to maxNpn-r16.

c) The order of elements corresponds to the order of SNPNs present in SIB1.

d) An SNPN indicates its support of a particular GIN by setting the bit position in the bitmap corresponding to the index of the GIN as derived from the GINList-r17.

e) The bitmap is read from left to right with MSB position corresponding to index 0 from GINList-r17.

f) The length of each bitmap is equal to maxGIN-r17 which is the maximum number of GINs that can be supported in a cell.

3) An all 0 bitmap signifies that no GIN is associated with that SNPN.

The following Table 3 is an illustration of ASN signalling of option 3a.

TABLE 3

```
SIBx
SIBx contains the supported GINs of the NPNs listed in SIB1.
-- ASN1START
-- TAG-SIB10-START
SIBx-r17 ::= SEQUENCE {
GINList-r17 SEQUENCE (SIZE(1... maxGIN-r17)) OF snpn-r16
OPTIONAL,
onboardingGinSnpn-Mapping SEQUENCE (SIZE(1...maxNPN-r16)) OF
ginBitmap- r17 OPTIONAL,
externalCredGinSnpn-Mapping SEQUENCE (SIZE(1......xNPN-r16)) OF
ginBitmap- r17 OPTIONAL,
nonCriticalExtension SEQUENCE { } OPTIONAL
}
ginBitmap-r17 BIT STRING (SIZE(maxGIN-r17))
-- TAG-SIB10-STOP
-- ASN1STOP
```

| SIBx Field descriptions |
|---|
| GINList-r17<br>GINList-r17 is used to configure the list of GINs supported in the cell.<br>onboardingGinSnpn-Mapping<br>This field gives the set of GINs which support onboarding and are associated with each of the broadcasted SNPNs in SIB1<br>If a SNPN does not support GINs, the associated bitmap will be all 0s.<br>externalCredGinSnpn-Mapping<br>This field gives the set of GINs which support external CH access and are associated with each of the broadcasted SNPNs in SIB1.<br>If a SNPN does not support GINs, the associated bitmap will be all 0s.<br>ginBitmap-r17<br>This field gives the bitmap of the GINs listed in gin-List-r17.The bitmap is interpreted from left to right and each bit corresponds to the GIN listed in GINList-r17and the bit will be set to 1 if the GIN is associated with a SNPN. |
| maxGIN-r17: Maximum number of GINs supported in a cell. |

In an example, below is representation of the System information blocks

```
SIB18-r17 ::= SEQUENCE {
  gin-ElementList-r17 SEQUENCE (SIZE (1..maxGIN-r17)) OF
GIN-Element-r17 OPTIONAL, -- Need R
  gins-PerSNPN-List-r17 SEQUENCE (SIZE (1..maxNPN-r16)) OF
GINs- PerSNPN-r17 OPTIONAL, -- Need R
  lateNonCriticalExtension OCTET STRING OPTIONAL,
  ...
  }
  GIN-Element-r17 ::= SEQUENCE {
  plmn-Identity-r17 PLMN-Identity,
  nid-List-r17 SEQUENCE (SIZE (1..maxGIN-r17)) OF NID-r16
  }
  GINs-PerSNPN-r17 ::= SEQUENCE {
  supportedGINs-r17 BIT STRING (SIZE (1..maxGIN-r17)) OPTIONAL
  -- Need R
  }
```

As shown in the FIG. 6, at 1, the network entity (200) sends the SIB1 broadcasting list SNPNs in the cell to the UE (100). At 2, the network entity (200) sends the SIBx broadcasting GIN list per cell with bitmaps of which GINs for onboarding and external CH access purpose per SNPN. At 3, UE (100) performs the SNPN selection based on SNPN list in SIB1 and GIN list in SIBx. At 4, the UE (100) performs the RRC connection establishment, towards selected SNPN, with the network entity (200).

Option 3b: (as shown in FIG. 7 illustrates the signaling flow for broadcasting GINs using this solution and UE (100) utilizing it to perform network selection). Follows the signalling similar to option 3a, but with following modifications:

a) Broadcast two indicators (onboardingGIN-Support and externalChGIN-Support) in NPN-IdentityInfo-r16 as part of SIB1. These indicators notify UE (100) if there are GINs being broadcasted for that SNPN.

b) The size of list of bitmap is not fixed but depends on the number of SNPNs supporting GINs. The maximum size of list is maxNpn-r16.

c) The order of bitmaps in list follows the order of SNPNs in SIB1 and skips the SNPNs which does not indicate that it support GINs. This reduces the overhead in signalling in case of SNPNs not supporting GINs but avoiding the sending of all 0 bitmap.

The following Table 4 is an illustration of the ASN signalling structure for option 3b.

TABLE 4

```
NPN-IdentityInfoList
The IE NPN-IdentityInfoList includes a list of NPN identity information.
-- ASN1START
-- TAG-NPN-IDENTITYINFOLIST-START
NPN-IdentityInfoList-r16 ::= SEQUENCE (SIZE (1..maxNPN-r16)) OF
NPN- IdentityInfo-r16
NPN-IdentityInfo-r16 ::= SEQUENCE {
npn-IdentityList-r16 SEQUENCE (SIZE (1..maxNPN-r16)) OF
NPN-Identity-r16, trackingAreaCode-r16 TrackingAreaCode,
ranac-r16 RAN-AreaCode OPTIONAL, -- Need R
cellIdentity-r16 CellIdentity,
cellReservedForOperatorUse-r16 ENUMERATED {reserved,
notReserved},
iab-Support-r16 ENUMERATED {true} OPTIONAL, -- Need S
...,
[[
onboardingGIN-Support ENUMERATED {true} OPTIONAL,
externalChGIN-Support ENUMERATED {true} OPTIONAL,
]]
}
-- TAG-NPN-IDENTITYINFOLIST-STOP
-- ASN1STOP
```

| onboardingGIN-Support |
|---|
| Indicates whether the NPN supports GINs related to onboarding and if not supported, the bitmap for this SNPN will not be present in onboardingGin2Snpn-Mapping sent as part of SIBx |

| externalChGIN-Support |
|---|
| Indicates whether the NPN supports GINs related to external Credential access and if not supported, the bitmap for this SNPN will not be present in externalCredGin2Snpn- Mapping sent as part of SIBx |

As shown in the FIG. 7, at 1, the network entity (200) sends the SIB1, broadcasting list SNPNs in the cell with indication per SNPN if it supports GINs for onboarding and external CH access, to the UE (100). At 2, the network entity (200) sends the SIBx broadcasting GIN list per cell with bitmaps of which GINs for onboarding and external CH access purpose per SNPN to the UE (100). At 3, UE (100) performs the SNPN selection based on SNPN list in SIB1 and GIN list in SIBx. At 4, the UE (100) performs the RRC connection establishment, towards selected SNPN, with the network entity (200).

In an example scenario depicting the above signaling case for option 3A, the network deployment consisting of the shared network with SNPN A and SNPN B sharing the gNB where SNPN A and SNPN B allow the UE access using external credentials. The SNPN A has Service Level Agreement (SLA) with Service Provider (SP) SP1 and SP2, identified through GINs GIN1 and GIN2 respectively. SNPN B has SLAs with SP2 identified by GIN2 for external credential access and GIN3 for onboarding access. The network broadcasts in SIB1 the list of SNPN as {SNPN A, SNPN B} and flag indicating support of SNPN A and SNPN B to allow access to UEs with external credentials and flag indicating SNPN B's support of access for onboarding purpose.

The SIBx broadcasting GINs consists of the following sample signaling:

```
SIBx-r17 {
GINList-r17 {GIN 1, GIN 2, GIN 3},
onboardingGinSnpn-Mapping {{000},{001}},
externalCredGinSnpn-Mapping {{110},{010}}
}
```

The UE holding subscription to SP1 is configured with network selection information, containing list of preferred GIN list as {GIN1}. Upon receiving SIB1 and SIBx, the UE forwards the SNPN and GIN mapping to NAS layer where the SNPN and GINs are compared with the stored subscription data. In this example scenario, the received SNPN and GINs are forwarded to NAS from AS in a sample format as shown below:

{SNPN ID: SNPN A, external credential access supported, external CH GIN list {GIN1, GIN2}}, {SNPN ID: SNPN B, external credential access supported, external CH GIN list {GIN2}, Onboarding access supported, Onboarding GIN list {GIN3}}

Since the preferred GIN configured in UE is GIN1, the result of network selection is SNPN A which supports GIN1. The NAS indicates to AS the selected SNON as SNPN A and AS performs cell selection procedure to select a cell which broadcasts support for SNPN A.

Enabling Emergency services: In order to enable the emergency services in the SNPN, the network entity (200) has to support emergency calls over IMS for UEs (100) accessing the network entity (200) in the SNPN access mode. In legacy case of a Public Land Mobile Network (PLMN) based network, the support of emergency call over the IMS in a cell is indicated by broadcasting of ims-EmergencySupport field in SIB1. For example, ims-EmergencySupport field indicates whether an SNPN supports IMS emergency bearer services. The UE (100) not registered to any PLMN and not in the coverage area of PLMNs providing normal service and when in need to perform emergency call, will use the broadcasted indication to select a suitable cell and request for emergency service.

In an embodiment, a new indicator in the SIB1 is introduced ims-EmergencySupportForSNPN-r17 which may be used to indicate the support of IMS emergency services for the UE (100) trying to access the cell in the SNPN access mode. This indicator is broadcasted if at least one SNPN (in case of shared networks) in the cell supports emergency services.

The reason to introduce the new indicator instead of extending the existing ims-EmergencySupport field is to avoid ambiguity arising in case of a shared network deployment of PLMN and/or SNPNs in which not all network providers support emergency services.

In another embodiment, the network entity (200) broadcasts indication as part of SIB1 to notify UE (100) if Emergency Call (eCall) over SNPN is supported. In case of PLMNs, the cell broadcasts the support for eCall over IMS only if all PLMNs in case of shared network in the cell supports the feature. To extend this feature to SNPNs, there can be two possible approaches that can be followed:

A. Option 1: Extend same principles as the PLMNs and indicate the support of the feature in the cell only if all SNPNs support eCall over the IMS.

B. Option 2; Have an indicator per-SNPN signalling its support for the feature.

Option 1 has the benefit of having lower signalling overhead, whereas option 2 provides more flexibility in deployment. Since SNPNs may be deployed to different services and requirements, all SNPNs sharing the network entity (200) might not support the eCall over IMS feature. So, option 2 provides a granular indication on which SNPN supports the feature and UE (100) can establish connection accordingly.

The following are the network side changes proposed:

1. Network entity (200) broadcasts the indicator ims-EmergencySupportForSNPN-r17 in SIB1 if at least one SNPN in the cell supports IMS Emergency call services.
2. Network entity (200) broadcasts the indication for support of eCall over IMS by one of the following means
   i. (Option 1) Including eCallOverIMS-SupportForSNPN-r17 in SIB1 if the SNPN or all the SNPNs in a network sharing scenario support eCall over IMS.
   ii. (Option 2) Including an eCallOverIMSSupport-r17 in NPN-IdentityInfo-r16 if that SNPN supports eCall over IMS feature.

A sample ASNI depiction of the signalling solution following aforementioned change in option 1+change in 2 option 1 is shown Table 5 below.

TABLE 5

```
SIB1-v1630-IEs ::= SEQUENCE {
uac-BarringInfo-v1630 SEQUENCE {
uac-AC1-SelectAssistInfo-r16 SEQUENCE (SIZE (2..maxPLMN)) OF
UAC- AC1-SelectAssistInfo-r16
} OPTIONAL, -- Need R
nonCriticalExtension SIB1-v17-IEs OPTIONAL
}
UAC-AccessCategory1-SelectionAssistanceInfo ::= ENUMERATED {a,
b, c}
UAC-AC1-SelectAssistInfo-r16 ::= ENUMERATED {a, b, c,
notConfigured}
SIB1-v17-IEs ::= SEQUENCE {
ims-EmergencySupportForSNPN-r17 ENUMERATED {true}
OPTIONAL, -- Need R
eCallOverIMS-SupportForSNPN-r17 ENUMERATED {true}
OPTIONAL, -- Need R
nonCriticalExtension SEQUENCE { } OPTIONAL
}
```

| SIB1 field descriptions |
|---|
| ims-EmergencySupportForSNPN-r17 |
| Indicates whether the cell supports IMS emergency bearer services over SNPN for UEs in limited service mode. If absent, IMS emergency call is not supported by the network in the cell for UEs accessing the cell in in limited service mode. |
| eCallOverIMS-SupportForSNPN-r17 |
| Indicates whether the cell supports eCall over IMS services over SNPN. If absent, eCall over IMS is not supported by the SNPNs in the cell. |

A sample ASNI depiction of the signalling solution following afore mentioned change in option 1+change in 2 option 2 is shown Table 6 below.

TABLE 6

```
SIB1
SIB1-v1630-IEs ::= SEQUENCE {
uac-BarringInfo-v1630 SEQUENCE {
uac-AC1-SelectAssistInfo-r16 SEQUENCE (SIZE (2..maxPLMN)) OF
UAC- AC1-SelectAssistInfo-r16
} OPTIONAL, -- Need R
nonCriticalExtension SIB1-v17-IEs OPTIONAL
}
UAC-AccessCategory1-SelectionAssistanceInfo ::= ENUMERATED {a,
b, c}
UAC-AC1-SelectAssistInfo-r16 ::= ENUMERATED {a, b, c,
notConfigured}
SIB1-v17-IEs ::= SEQUENCE {
ims-EmergencySupportForSNPN-r17 ENUMERATED {true}
OPTIONAL, -- Need R
nonCriticalExtension SEQUENCE { } OPTIONAL
}
NPN-IdentityInfoList information element
-- ASN1START
-- TAG-NPN-IDENTITYINFOLIST-START
NPN-IdentityInfoList-r16 ::= SEQUENCE (SIZE (1..maxNPN-r16)) OF
NPN- IdentityInfo-r16
NPN-IdentityInfo-r16 ::= SEQUENCE {
npn-IdentityList-r16 SEQUENCE (SIZE (1..maxNPN-r16)) OF
NPN-Identity-r16, trackingAreaCode-r16 TrackingAreaCode,
ranac-r16 RAN-AreaCode OPTIONAL, -- Need R
cellIdentity-r16 CellIdentity,
cellReservedForOperatorUse-r16 ENUMERATED {reserved,
notReserved},
iab-Support-r16 ENUMERATED {true} OPTIONAL, -- Need S
...,
[[
eCallOverIMS-Support-r17 ENUMERATED {true} OPTIONAL, --
Need R
]]
}
-- TAG-NPN-IDENTITYINFOLIST-STOP
-- ASN1STOP
```

| NPN-IdentityInfoList field descriptions |
|---|
| eCallOverIMS-Support-r17 |
| Indicates whether the SNPN supports eCall over IMS services. If absent, eCall over IMS is not supported by the SNPN. |

The UE Access Stratum (AS) side procedures are as follows:

UE upon receiving SIB1,

If UE is in SNPN access mode, if ims-EmergencySupportForSNPN-r17 is present, forward the indication to upper layers.

else, the field is ignored.

In case of unavailability of a suitable cell, the UE shall determine a cell to be acceptable based on the broadcasted indication and camp on to it.

Enhanced network selection based on Service requirements of UE: The SNPN deployment can be deployed with varying capabilities and provisioned for specifically serving different kinds of services such as mission critical services, multimedia services etc. In case of a UE (100) trying to access the SNPN for a specific service, the legacy procedure dictates that the UE (100) use the subscription information to perform network selection and cell selection. But with introduction of external credential access of SNPNs, the UE (100) with the subscription from a service provider having SLA with different SNPNs for providing the user different services, the UE (100) can now select the network among these preferred SNPNs and/or SNPNs broadcasting the preferred Group IDs of the Service providers. In such cases, the UE (100) might end up selecting a network/cell blindly based on the priority list despite the network's inability to cater to the service the UE (100) is requesting. This would result in either rejection from the network or redirection from the network to appropriate cell/network capable of serving the UE (100). This causes delay in the accessing of network by the UE (100). In order to overcome this issue, the following solution is proposed:

In an embodiment, the UE (100) is configured by the subscription provider with "list of subscriber data" and each entry in the list is provisioned with the at least one of the possible combination of following:

1. subscriber identity,
2. credentials,
3. SNPN identity of subscribed SNPN,
4. Unified access control configuration,
5. User Route Selection Policy (URSP),
6. Default NSSAI, and
7. If UE (100) supports access to SNPN using credential holder
   a) User controlled list of preferred SNPNs, where each entity holds an SNPN identity along with different priority values for different service types
   b) Credential holder controlled list of preferred SNPNs, where each entity holds an SNPN identity along with different priority values for different service types
   c) Credential holder controlled priority list of Group IDs, where each entity holds an SNPN identity along with different priority values for different service types In another embodiment, the service type can be service provider defined or standardized types such as but not limiting to, delay sensitive services, multimedia services, mission critical services etc.

Depending on the kind of service the UE (100) is trying to gain access to, the appropriate priority value/order will be used for performing network selection operation.

The UE (100) selects an SNPN, if available and allowable, in the following order:

1) the SNPN with which the UE (100) was last registered;
2) the SNPN identified by an SNPN identity of the subscribed SNPN
3) if the UE (100) supports access to an SNPN using credentials from a credentials holder, and for the specific service type the UE (100) wants to gain access to,
   a) the SNPN identity contained in the user controlled list of preferred SNPNs in priority order for the service type the UE (100) is requesting access;
   b) the SNPN identity contained in the credentials holder controlled list of preferred SNPNs in priority order for that service type the UE (100) is requesting access;
   c) a GIN contained in the credentials holder controlled prioritized list of GINs in priority order for that service type the UE (100) is requesting access;
   d) a SNPN which broadcasts an indication that the SNPN allows registration attempts from MSs that are not explicitly configured to select the SNPN.

FIG. 2 shows various hardware components of the UE (100), according to embodiments as disclosed herein. In an embodiment, the UE (100) includes a processor (110), a communicator (120), a memory (130), and a network selection controller (140). The processor (110) is coupled with the communicator (120), the memory (130), and the network selection controller (140).

The network selection controller (140) acquires the SIB1. The SIB1 comprises the SNPN list and the flag indicating one of per cell support for at least one service and per SNPN support for the at least one service. Further, the network selection controller (140) performs the at least one cell selection to latch on at least one cell upon selecting at least one SNPN from the SIB1. In an embodiment, the network selection controller (140) forwards the SNPN list and the flag indicating one of per cell support for the at least one service and per SNPN support for the at least one service from an AS layer to a NAS layer. Further, the network selection controller (140) performs the network selection at the NAS layer based on the at least one SNPN support of the at least one service. The network selection is performed at the NAS layer, when the UE (100) is in any cell state. Further, the network selection controller (140) indicates the at least one selected SNPN from the NAS layer to the AS layer. Further, the network selection controller (140) performs the cell selection to latch on the at least one cell based on the at least one selected SNPN.

Further, the network selection controller (140) initiates at least one service session with the network entity (200) based on the at least one cell selection. In an embodiment, the network selection controller (140) establishes the at least one service session with the network entity (200) based on the cell selection from the NAS layer to the AS layer and initiates the at least one service session with the network entity (200) based on the establishment.

The network selection controller (140) acquires the SIB1, where the SIB1 includes a SNPN ID, an onboarding indicator, an external credential access indicator, and a scheduling information for Group ID for Network Selection (GIN) SIB. Further, the network selection controller (140) acquires the SIBx. The SIBx comprises at least one of a first parameter and a second parameter, wherein the first parameter comprises at least one of a supported Group ID for Network Selection (GIN) list and GINs to SNPN mapping information. The second parameter comprises at least one of a supported GIN list, external CH access GINs to SNPN mapping, and onboarding GINs to SNPN mapping. Further, the network selection controller (140) performs the at least one cell selection to latch on at least one cell upon selecting at least one SNPN based on the acquired SIB1 and acquired SIBx.

In an embodiment, the network selection controller (140) forwards the SNPN list, the GIN list per SNPN, and the SNPN from the AS layer to the NAS layer. Further, the network selection controller (140) performs the network selection at the NAS layer based on a subscription data, the received SNPN list, a support for external CH access and the supported GIN list. Further, the network selection controller (140) notifies the at least one selected SNPN to the AS layer from the NAS layer. Further, the network selection controller (140) performs the at least one cell selection to latch on at least one cell upon selecting at least one SNPN.

In an embodiment, the network selection controller (140) forwards the SNPN list, the GIN list per SNPN for external CH access, the GIN list per SNPN for onboarding form the AS layer to the NAS layer. Further, the network selection controller (140) performs the network selection at the NAS layer based on a subscription data and the received SNPN list, a support for external CH access and the supported GIN lists. Further, the network selection controller (140) notifies the selected SNPN to the AS layer from the NAS layer. Further, the network selection controller (140) performs the at least one cell selection to latch on at least one cell upon selecting at least one SNPN.

Further, the network selection controller (140) initiates the at least one service session with the network entity (200) based on the at least one cell selection.

The network selection controller (140) acquires the subscription information. The subscription information includes at least one service specific network selection information. The at least one service specific network selection information includes at least one of a SNPN priority list per service, a single list with each SNPN having different priority values for each services and a single priority list indicating each SNPN supported service type. Further, the network selection controller (140) selects and uses the at least one service specific network selection information to perform a SNPN selection. Further, the network selection controller (140) performs the at least one cell selection to latch on at least one cell upon selecting at least one SNPN. Further, the network selection controller (140) initiates the at least one service session with a network entity (200) based on the at least one cell selection.

The network selection controller (140) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be a ML model based controller and AI model based controller. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 2 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

FIG. 3 shows various hardware components of the network entity (200), according to embodiments as disclosed herein. In an embodiment, the network entity (200) includes a processor (210), a communicator (220), a memory (230), and a network selection controller (240). The processor (210) is coupled with the communicator (220), the memory (230), and the network selection controller (240).

The network selection controller (240) transmits the SIB1 to the UE (100). The SIB1 includes the SNPN ID, the onboarding indicator, the external credential access indicator, and the scheduling information for a system information blockX (SIBx) for Group ID for Network Selection (GIN). Further, the network selection controller (240) transmits the SIBx. The SIBx comprises at least one of a first parameter and a second parameter. The first parameter includes at least one of a supported GIN list and GINs to SNPN mapping information. The second parameter includes at least one of a supported GIN list, external CH access GINs to SNPN mapping, and onboarding GINs to SNPN mapping. Further, the network selection controller (140) performs the admission of connection request from UE (100) for obtaining access to the at least one service supported by the network entity (200) and establish the at least one service session with the UE (100).

The network selection controller (240) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be a ML model based controller and AI model based controller. A function associated with the AI model may be performed through the non-volatile memory, the volatile memory, and the processor (210). The processor (210) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 3 shows various hardware components of the network entity (200) but it is to be understood that other embodiments are not limited thereon. In other embodiments, the network entity (200) may include less or more number of components. Further, the labels or names of the components are used only for illustrative purpose and does not limit the scope of the invention. One or more components can be combined together to perform same or substantially similar function in the network entity (200).

FIG. 8 illustrates a sequential diagram of GIN broadcasting in SIB x indicating the common mapping between GIN list and SNPN for both onboarding and external CH access use, according to embodiments as disclosed herein.

At 1, the network entity (200) sends the SIB1 to the UE (100). The SIB1 includes the SNPN ID, the onboarding indicator, the external credential access indicator, and the scheduling information for a system information blockX (SIBx) for Group ID for Network Selection (GIN). At 2, the AS layer of the UE (100) acquires the SIB1. At 3, the network entity (200) sends the SIBx to the UE (100). The SIBx includes the supported GIN list, and the GINs to SNPN mapping information. At 4, the AS layer of the UE (100) acquires the SIBx.

At 5, the AS layer of the UE (100) forwards the SNPN list, the GIN list per SNPN, the SNPN to the NAS layer of the UE (100). At 6, the NAS layer of the UE (100) performs the network selection based on subscription data, received SNPN list, the support for external CH access and the supported GIN lists. At 7, the NAS layer of the UE (100) indicates the selected SNPN to the AS layer of the UE (100). At 8, the AS of the UE (100) performs cell selection based on selected SNPN and initiates connection establishment. At 9, the UE (100) establishes the connection with the network entity (200).

FIG. 9 illustrates a sequential diagram of GIN broadcasting in SIB x indicating a separate list for mapping between GIN list and SNPN for onboarding and external CH access use, according to embodiments as disclosed herein. At 1, the network entity (200) sends the SIB1 to the UE (100). The SIB1 includes the SNPN ID, the onboarding indicator, the external credential access indicator, and the scheduling information for a system information blockX (SIBx) for Group ID for Network Selection (GIN). At 2, the AS layer of the UE (100) acquires the SIB1. At 3, the network entity (200) sends the SIBx to the UE (100). The SIBx includes the supported GIN list, external CH access GINs to SNPN mapping, onboarding GINs to SNPN mapping. At 4, the AS layer of the UE (100) acquires the SIBx. At 5, the AS layer of the UE (100) forwards the SNPN list, GIN list per SNPN for external CH access, GIN list per SNPN for onboarding, to the NAS of the UE (100).

At 6, the NAS layer of the UE (100) performs the network selection based on subscription data, received SNPN list, the support for external CH access and the supported GIN lists. At 7, the NAS layer of the UE (100) indicates the selected SNPN to the AS layer of the UE (100). At 8, the AS of the UE (100) performs cell selection based on selected SNPN and initiates connection establishment. At 9, the UE (100) establishes the connection with the network entity (200).

FIG. 10 illustrates a sequential diagram of broadcasting in SIB1 SNPN support of emergency call over IMS, according to embodiments as disclosed herein.

At 1, the network entity (200) sends the SIB1 to the UE (100). The SIB1 includes the SNPN list and the flag indicating perCell/per SNPN support for ims-Emergency call. At 2, the AS layer of the UE (100) acquires SIB1. At 3, the AS layer of the UE (100) forwards the SNPN list, the flag for per cell/per SNPN support for ims-emergency for SNPN to the NAS layer of the UE (100). At 4, when the UE (100) is in any cell state, the NAS layer of the UE (100) performs network selection based on the SNPN support of the emergency service. At 5, the NAS layer of the UE (100) sends the selected SNPN to the AS layer of the UE (100). At 6, the AS layer of the UE (100) performs the cell selection based on selected SNPN and latches on to the cell. At 7, the NAS layer of the UE (100) establishes the emergency session. At 8, the NAS layer of the UE (100) initiates the emergency session. At 9, the UE (100) establishes the connections with the network entity (200). The connections indicate the establishment cause with emergency service.

FIG. 11 illustrates a sequential diagram of broadcasting in SIB1 SNPN support of eCall over IMS, according to embodiments as disclosed herein.

At 1, the network entity (200) sends the SIB1 to the UE (100). The SIB1 includes the SNPN list and the flag indicating perCell/per SNPN support for eCallOver-ims. At 2, the AS layer of the UE (100) acquires SIB1. At 3, the AS layer of the UE (100) forwards the SNPN list, the flag for per cell/per SNPN support for eCall over IMS for SNPN to the NAS layer of the UE (100). At 4, when the UE (100) is in any cell state, the NAS layer of the UE (100) performs the network selection based on the SNPN support of the emergency service. At 5, the NAS layer of the UE (100) sends the selected SNPN to the AS layer of the UE (100). At 6, the AS layer of the UE (100) performs the cell selection based on selected SNPN and latches on to the cell. At 7, the NAS layer of the UE (100) establishes the eCall over IMS session. At 8, the NAS layer of the UE (100) initiates the emergency session. At 9, the UE (100) establishes the connections with the network entity (200). The connections indicate the establishment cause with emergency service.

FIG. 12 to FIG. 14 are flow charts (1200-1400) illustrating methods, implemented by the UE (100), for handling the network selection information in the non-public network (1000), according to embodiments as disclosed herein.

As shown in the FIG. 12, the operations (1202-1206) are performed by the network selection controller (140). At 1202, the method includes acquiring the SIB1, where the SIB1 includes at least one of a SNPN list and a flag indicating one of per cell for at least one service and per SNPN support for the at least one service. At 1204, the method includes performing the at least one cell selection to latch on at least one cell upon selecting at least one SNPN from the SIB1. At 1206, the method includes initiating the at least one service session with the network entity (200) based on the at least one cell selection.

As shown in the FIG. 13, the operations (1302-1308) are performed by the network selection controller (140). At 1302, the method includes acquiring the SIB1. The SIB1 includes at least one of the SNPN ID, an onboarding indicator, an external credential access indicator, and the scheduling information for the system information blockX (SIBx) for Group ID for Network Selection (GIN). At 1304, the method includes acquiring the SIBx. The SIBx includes at least one of a first parameter and a second parameter. The first parameter includes at least one of a supported Group ID for Network Selection (GIN) list and GINs to SNPN mapping information. The second parameter includes at least one of a supported GIN list, external Credential Holders (CH) access GINs to SNPN mapping, and onboarding GINs to SNPN mapping. At 1306, the method includes performing at least one cell selection to latch on at least one cell upon selecting at least one SNPN based on the acquired SIB1 and acquired SIBx. At 1308, the method includes initiating at least one service session with the network entity (200) based on the at least one cell selection.

As shown in the FIG. 14, the operations (1402-1408) are performed by the network selection controller (140). At 1402, the method includes acquiring the subscription information. The subscription information includes at least one service specific network selection information. The at least one service specific network selection information includes at least one of a SNPN priority list per service, a single list with each SNPN having different priority values for each services and a single priority list indicating each SNPN supported service type. At 1404, the method includes selecting and using the at least one service specific network selection information to perform the SNPN selection. At 1406, the method includes performing the at least one cell selection to latch on at least one cell upon selecting at least one SNPN. At 1408, the method includes initiating at least one service session with the network entity (200) based on the at least one cell selection.

FIG. 15 is a flow chart (1500) illustrating methods, implemented by the network entity (200), for handling the network selection information in the non-public network (1000), according to embodiments as disclosed herein.

As shown in the FIG. 15, the operations (1502-1508) are performed by the network selection controller (240). At 1502, the method includes transmitting the SIB1 to the UE (100). The SIB1 includes at least one of the SNPN ID, the onboarding indicator, an external credential access indicator, and a scheduling information for Group ID for Network Selection (GIN) SIB. At 1504, the method includes transmitting the SIBx. The SIBx includes at least one of a first parameter and a second parameter. The first parameter includes at least one of a supported Group ID for Network Selection (GIN) list and GINs to SNPN mapping information, wherein the second parameter comprises at least one of a supported GIN list, external Credential Holders (CH) access GINs to SNPN mapping, and onboarding GINs to SNPN mapping. At 1506, the method includes performing the admission of connection request from UE (100) for obtaining access to at least one of service supported by the network entity. At 1508, the method includes establishing the at least one service with the UE (100).

The various actions, acts, blocks, steps, or the like in the flow charts (1200-1500) may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the scope of the embodiments as described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

The invention claimed is:

1. A method performed by a user equipment (UE) in a wireless communication system, the method comprising:

receiving, from a base station, first system information including information on at least one stand-alone non-public network (SNPN);

receiving, from the base station, second system information including information on a first list of at least one group identifier for network selection (GIN) and information on a second list of at least one bitmap, wherein the at least one bitmap indicates at least one GIN supported by the at least one SNPN and a bit in the at least one bitmap corresponds to an index of the at least one GIN in the first list; and performing, with the base station, a radio resource control (RRC) establishment for an SNPN selected based on at least one of the first system information and the second system information.

2. The method of claim 1, wherein a leftmost bit in the at least one bitmap corresponds to a GIN with a lowest index among the first list of the at least one GIN.

3. The method of claim 1, wherein the first system information further includes information indicating whether an internet protocol (IP) multimedia subsystem (IMS) emergency service is supported by each of the at least one SNPN.

4. The method of claim 1, wherein the first system information is received through a system information block 1 (SIB1).

5. A method performed by a base station in a wireless communication system, the method comprising:

transmitting first system information including information on at least one stand-alone non-public network (SNPN);

transmitting second system information including information on a first list of at least one group identifier for network selection (GIN) and information on a second list of at least one bitmap, wherein the at least one bitmap indicates at least one GIN supported by the at least one SNPN and a bit in the at least one bitmap corresponds to an index of the at least one GIN in the first list; and performing, with a user equipment (UE), a radio resource control (RRC) establishment for an SNPN selected based on at least one of the first system information and the second system information.

6. The method of claim 5, wherein a leftmost bit in the at least one bitmap corresponds to a GIN with a lowest index among the first list of the at least one GIN.

7. The method of claim 5, wherein the first system information further includes information indicating whether an internet protocol (IP) multimedia subsystem (IMS) emergency service is supported by each of the at least one SNPN.

8. The method of claim 5, wherein the first system information is transmitted through a system information block 1 (SIB1).

9. A user equipment (UE) in a wireless communication system, the UE comprising:

a transceiver; and a controller configured to:

receive, from a base station via the transceiver, first system information including information on at least one stand-alone non-public network (SNPN), receive, from the base station via the transceiver, second system information including information on a first list of at least one group identifier for network selection (GIN) and information on a second list of at least one bitmap, wherein the at least one bitmap indicates at least one GIN supported by the at least one SNPN and a bit in the at least one bitmap corresponds to an index of the at least one GIN in the first list, and perform, with the base station, a radio resource control (RRC) establishment for an SNPN selected based on at least one of the first system information and the second system information.

10. The UE of claim 9, wherein a leftmost bit in the at least one bitmap corresponds to a GIN with a lowest index among the first list of the at least one GIN.

11. The UE of claim 9, wherein the first system information further includes information indicating whether an internet protocol (IP) multimedia subsystem (IMS) emergency service is supported by each of the at least one SNPN.

12. The UE of claim 9, wherein the first system information is received through a system information block 1 (SIB1).

13. A base station in a wireless communication system, the base station comprising:

a transceiver; and a controller configured to:

transmit, via the transceiver, first system information including information on at least one stand-alone non-public network (SNPN), transmit, via the transceiver, second system information including information on a first list of at least one group identifier for network selection (GIN) and information on a second list of at least one bitmap, wherein the at least one bitmap indicates at least one GIN supported by the at least one SNPN and a bit in the at least one bitmap corresponds to an index of the at least one GIN in the first list, and perform, with a user equipment (UE), a radio resource control (RRC) establishment for an SNPN selected based on at least one of the first system information and the second system information.

14. The base station of claim 13, wherein a leftmost bit in the at least one bitmap corresponds to a GIN with a lowest index among the first list of the at least one GIN.

15. The base station of claim 13, wherein the first system information further includes information indicating whether an internet protocol (IP) multimedia subsystem (IMS) emergency service is supported by each of the at least one SNPN.

16. The base station of claim 13, wherein the first system information is transmitted through a system information block 1 (SIB1).

* * * * *